United States Patent
Hu et al.

(10) Patent No.: US 9,128,905 B2
(45) Date of Patent: *Sep. 8, 2015

(54) LARGE COLUMNAR TEXT FILE EDITOR

(71) Applicant: The Boeing Company, Chicago, IL (US)

(72) Inventors: Weigang Hu, Redmond, WA (US); Charles Mark Williams, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 302 days.

This patent is subject to a terminal disclaimer.

(21) Appl. No.: 13/774,149

(22) Filed: Feb. 22, 2013

(65) Prior Publication Data

US 2013/0167022 A1 Jun. 27, 2013

Related U.S. Application Data

(63) Continuation of application No. 12/603,908, filed on Oct. 22, 2009, now Pat. No. 8,407,588.

(51) Int. Cl.
*G06F 17/21* (2006.01)
*G06F 17/24* (2006.01)

(52) U.S. Cl.
CPC ............... *G06F 17/21* (2013.01); *G06F 17/24* (2013.01)

(58) Field of Classification Search
CPC ........................................................ G06F 17/21
USPC ......................................................... 715/256
See application file for complete search history.

(56) References Cited

U.S. PATENT DOCUMENTS

| | | | |
|---|---|---|---|
| 5,926,623 A | 7/1999 | Tsukakoshi et al. | |
| 6,115,759 A | 9/2000 | Sugimura et al. | |
| 6,389,437 B2 | 5/2002 | Stoub | |
| 6,789,083 B2 | 9/2004 | Thelen | |
| 6,941,310 B2 | 9/2005 | Ahad et al. | |
| 7,024,414 B2 | 4/2006 | Sah et al. | |
| 7,143,086 B2 | 11/2006 | Miyamoto et al. | |
| 7,395,258 B2 | 7/2008 | Altinel et al. | |
| 7,421,440 B2 | 9/2008 | Pereira | |
| 7,428,524 B2 | 9/2008 | Burrows et al. | |

(Continued)

OTHER PUBLICATIONS

Viana, Nuno, Ricardo Raminhos, and João Moura-Pires. "A real time data extraction, transformation and loading solution for semi-structured text files." In Proceedings of the 12th Portuguese conference on Progress in Artificial Intelligence, pp. 383-394. Springer-Verlag, 2005.*

(Continued)

*Primary Examiner* — Frank D Mills
(74) *Attorney, Agent, or Firm* — Yee & Associates, P.C.

(57) ABSTRACT

The different advantageous embodiments provide a method for loading and editing text files. A text file is identified as input. A determination is made as to whether the text file is a columnar text file. If the text file is columnar, data information is retrieved for the text file. Pre-defined cache settings are identified. A determination is made as to whether the data information retrieved fits within the pre-defined cache settings. If the data information retrieved fits within the pre-defined cache settings, a determination is made as to whether the first row of the text file is a header row in a view. If the first row of the text file is not a header row, the text file is normalized. A view mode is selected for load and edit operations of the text file.

14 Claims, 21 Drawing Sheets

(56) References Cited

U.S. PATENT DOCUMENTS

| | | | |
|---|---|---|---|
| 7,552,130 | B2 | 6/2009 | Cook et al. |
| 7,624,235 | B2 | 11/2009 | Wadhawan et al. |
| 7,668,870 | B1 | 2/2010 | Sykes et al. |
| 7,739,311 | B2 | 6/2010 | Smith et al. |
| 7,953,769 | B1 | 5/2011 | Defrang et al. |
| 8,060,480 | B2 | 11/2011 | Gaertner |
| 8,185,546 | B2 | 5/2012 | Kumbi et al. |
| 8,301,798 | B2 | 10/2012 | Mond et al. |
| 8,407,588 | B1 | 3/2013 | Hu et al. |
| 2003/0028509 | A1* | 2/2003 | Sah et al. ............ 707/1 |
| 2004/0093336 | A1* | 5/2004 | Hu et al. ............ 707/100 |
| 2007/0094278 | A1 | 4/2007 | Huppert et al. |
| 2011/0022576 | A1* | 1/2011 | Gaertner ............ 707/704 |

OTHER PUBLICATIONS

Rhodes et al., "Iteration Aware Prefetching for Large Multidimensional Datasets," Proceedings of the 17th International Conference on Scientific and Statistical Database Management (SSDBM 2005), Jun. 2005, pp. 45-54.

Noyes, "Data Binding With Windows Forms 2.0: Programming Smart Client Data Application With .Net," Addison-Wesley Professional, Jan. 2006, pp. 160-165.

"EmEditor Basic Features," Emurasoft, Inc., copyright 1995-2009, 3 pages. Retrieved Oct. 22, 2009 from http://www.emeditorcom/modules/feature1/rewrite/tc_4html.

"VEDIT Info," Greenview Data, Inc., copyright 1998-2008, 6 pages. Retrieved Oct. 22, 2009 from http://www.vedit.com/Vedit-Info.htm.

Hu et al., "Large Columnar Text File Editor," U.S. Appl. No. 12/603,908, filed Oct. 22, 2009, 88 pages.

Office Action, dated Jul. 30, 2012, regarding U.S. Appl. No. 12/603,908, 16 pages.

Notice of Allowance, dated Nov. 21, 2012, regarding U.S. Appl. No. 12/603,908, 9 pages.

\* cited by examiner

LARGE COLUMNAR TEXT FILE EDITOR

This application is a continuation application of U.S. application Ser. No. 12/603,908, status pending.

BACKGROUND INFORMATION

1. Field

The present disclosure relates generally to a data processing system and more particularly to a system for loading data files. Still more particularly, the present disclosure relates to a system for loading and editing large columnar text files.

2. Background

Aircraft production data is often exported as columnar text data files for analysis such as comparison between logical data and physical data. These files are extremely large and often have a size that is greater than the physical random access memory (RAM) size of most computers. As a result of the large file size, there is limited capability to view and analyze the data. Data analysts or engineers cannot load the data into computer memory to check and verify data integrity and completeness due to the large file size exceeding available memory. Instead, the data must be checked manually.

The manual processes could possibly involve multiple approaches. One approach is to divide the large file into numerous smaller files. The smaller files are then loaded one at a time for editing, verifying, and/or comparing. Finally, all the divided smaller files must be combined back into a large file as a whole data set for further analysis. This approach is extremely time consuming, as the number of divided smaller files typically reaches into the hundreds. Another approach is to create a new specific database for storing the data content of the large file. This approach enables data analysis, such as editing, verifying, and/or comparing data, to be performed, but in a complicated way lacking user-friendly interfaces. This approach requires database administrators to perform the analysis that data analysts and/or data process engineers cannot perform. In addition, the creation and maintenance of an extra database can be costly. Still another approach is to use existing text editors to verify data. Existing text editors, which are able to edit large files, result in poor performance and a loss of the columnar view. These existing text editors instead display the data in continuous rows of characters that must be manually parsed by a human analyst or engineer. This approach cannot perform column-related operations, such as column sorting, column re-ordering, column deletion, and column comparison, for example.

Therefore, it would be advantageous to have a method and apparatus that takes into account one or more of the issues discussed above, as well as possibly other issues.

SUMMARY

The different advantageous embodiments provide a method for loading and editing text files. A text file is identified as input. A determination is made as to whether the text file is a columnar text file. If a determination is made that the text file is columnar, data information is retrieved for the text file. Pre-defined cache settings having a defined number of cached pages and a maximum number of rows per cached page and a maximum number of columns per cached page are identified. A determination is made as to whether the data information retrieved fits within the pre-defined cache settings. If a determination is made that the data information retrieved fits within the pre-defined cache settings, a determination is made as to whether the first row of the text file is a header row in a view. If a determination is made that the first row of the text file is not a header row, the text file is normalized. A view mode is selected for load and edit operations of the text file.

The different advantageous embodiments further provide a system for loading and editing text files comprising a number of text files and a data processing system. The data processing system is configured to execute an editor to identify a text file as input; determine whether the text file is a columnar text file; responsive to a determination that the text file is columnar, retrieve data information for the text file; identify pre-defined cache settings; determine whether the data information retrieved fits within the pre-defined cache settings; responsive to a determination that the data information retrieved fits within the pre-defined cache settings, determine whether the first row of the text file is a header row in a spreadsheet view; responsive to a determination that the first row of the text file is not a header row, normalize the text file; and select a mode for load and edit operations of the text file.

The different advantageous embodiments further provide a method for cached page data loading and display operations. A first row of a text file is set as a current focus row in a view. A current number of cached pages to be loaded into memory at a time is displayed in the view. A portion of data is initialized from the text file for the current number of cached pages for display.

A display view interface is initialized. A portion of the current number of cached pages is loaded and displayed into the display view interface. Data content of the text file is scanned.

The different advantageous embodiments further provide a method for cached page data change and save operations. A cell to be modified is identified in a view in virtual mode. A current focus row associated with the cell to be modified is identified. A defined number of cached pages of data content associated with the current focus row identified is loaded from a processed data temporary file and a processed index temporary file using a cached page data load and display process. A determination is made as to whether a cell change operation is activated. If a determination is made that the cell change operation is activated, the defined number of cached pages of data content displayed in the view is extracted and the view is changed from the virtual mode to real mode. The extracted data content is loaded and displayed in the view in the real mode and the process waits for cell changes to be completed.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
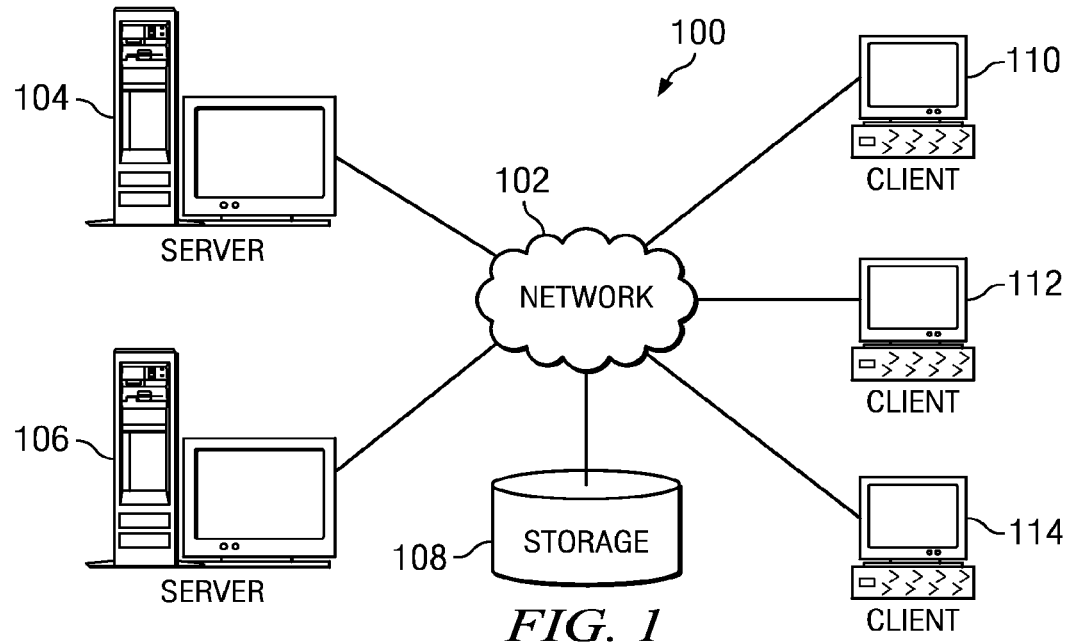
FIG. 1 is an illustration of a network of data processing systems in which the advantageous embodiments may be implemented.
Figure 2:
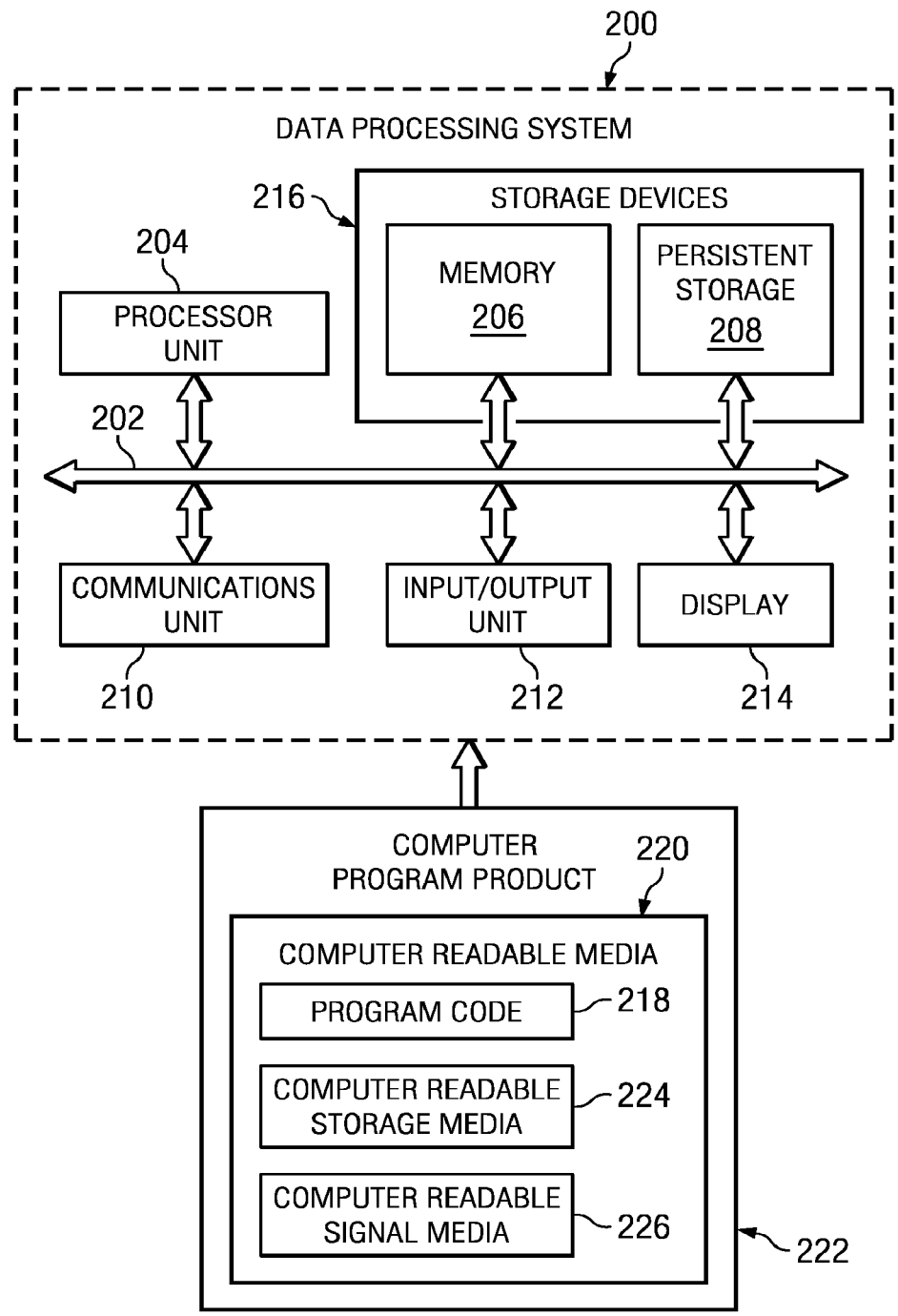
FIG. 2 is an illustration of a data processing system in accordance with an advantageous embodiment.

With reference now to the figures and in particular with reference to FIGS. 1-2, diagrams of data processing environments are provided in which advantageous embodiments may be implemented. It should be appreciated that FIGS. 1-2 are only illustrative examples and are not intended to assert or imply any limitation with regard to the environments in which different embodiments may be implemented. Many modifications to the depicted environments may be made.

FIG. 1 depicts an illustration of a network of data processing systems in which the advantageous embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. An editing system, such as editing system 302 in FIG. 3, may be implemented on one or more systems within a network of data processing systems, such as clients 110, 112, and 114, and/or server 104 and 106. Clients 110, 112, and 114 are clients to server 104 in this example. In these examples, server 104, server 106, client 110, client 112, and client 114 may be computers. Network data processing system 100 may include additional servers, clients, and other devices not shown.

Network data processing system 100 provides an environment in which an availability system may interact with a number of persons and/or other systems and in particular, may transmit, process, and receive availability requests within network data processing system 100. For example, an availability system executing on client 114 may transmit an availability request from a user utilizing client 114 to other availability systems, such as may be implemented on client 112 and client 110, in an illustrative example.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, an illustration of a data processing system is depicted in accordance with an illustrative embodiment. Data processing system 200 is an example of a computer, such as client 114 in FIG. 1, in which computer usable program code or instructions implementing the processes may be located for the illustrative embodiments.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize and take into account that current methods provide limited capability to view and analyze extremely large text files, that is, text files with sizes exceeding available memory on a data processing system on which the text files need to be loaded. Data analysts and engineers currently have no practical method for loading these text files with sizes exceeding available memory into a computer in order to check and verify data integrity and completeness, much less edit the data within the text file.

The different advantageous embodiments further recognize and take into account that currently available manual processes for data analysis of these large text files could possibly involve multiple approaches. One approach is to divide the large file into numerous smaller files. The smaller files are then loaded one at a time for editing, verifying, and/or comparing. Finally, all the divided smaller files must be combined back into a large file as a whole data set for further analysis. This approach is extremely time consuming, as the number of divided smaller files typically reaches into the hundreds. Another approach is to create a new specific database for storing the data content of the large file. This approach enables data analysis, such as editing, verifying, and/or comparing data, to be performed, but in a complicated way lacking user-friendly interfaces. This approach requires database administrators to perform the analysis that data analysts and/or data process engineers cannot perform, and creation and maintenance of an extra database is costly. Still another approach is to use existing text editors to verify data. Existing text editors, which are able to edit large files, result in poor performance and a loss of the columnar view. These existing text editors instead display the data in continuous rows of characters that must be manually parsed by a human analyst or engineer. This approach cannot perform column-related operations, such as column sorting, column re-ordering, column deletion, and column comparison, for example.

Therefore, the different advantageous embodiments provide a method for loading and editing text files. A text file is identified as input. A determination is made as to whether the text file is a columnar text file. If a determination is made that the text file is columnar, data information is retrieved for the text file. Pre-defined cache settings having a defined number of cached pages and a maximum number of rows per cached page and a maximum number of columns per cached page are identified. A determination is made as to whether the data information retrieved fits within the pre-defined cache settings. If a determination is made that the data information retrieved fits within the pre-defined cache settings, a determination is made as to whether the first row of the text file is a header row in a view. If a determination is made that the first row of the text file is not a header row, the text file is normalized. A view mode is selected for load and edit operations of the text file.

The different advantageous embodiments further provide a system for loading and editing text files comprising a number of text files and a data processing system. The data processing system is configured to execute an editor to identify a text file as input; determine whether the text file is a columnar text file; responsive to a determination that the text file is columnar, retrieve data information for the text file; identify pre-defined cache settings; determine whether the data information retrieved fits within the pre-defined cache settings; responsive to a determination that the data information retrieved fits within the pre-defined cache settings, determine whether the first row of the text file is a header row in a spreadsheet view; responsive to a determination that the first row of the text file is not a header row, normalize the text file; and select a mode for load and edit operations of the text file.

The different advantageous embodiments further provide a method for cached page data loading and display operations. A first row of a text file is set as a current focus row in a view. A current number of cached pages to be loaded into memory at a time is for display in the view. A portion of data is initialized from the text file for the current number of cached pages for display. A display view interface is initialized. A portion of the current number of cached pages is loaded and displayed into the display view interface. Data content of the text file is scanned.

The different advantageous embodiments further provide a method for cached page data change and save operations. A cell to be modified is identified in a view in virtual mode. A current focus row associated with the cell to be modified is identified. A defined number of cached pages of data content associated with the current focus row identified is loaded from a processed data temporary file and a processed index temporary file using a cached page data load and display process. A determination is made as to whether a cell change operation is activated. If a determination is made that the cell change operation is activated, the defined number of cached pages of data content displayed in the view is extracted and the view is changed from the virtual mode to real mode. The extracted data content is loaded and displayed in the view in the real mode and the process waits for cell changes to be completed.

Figure 3:
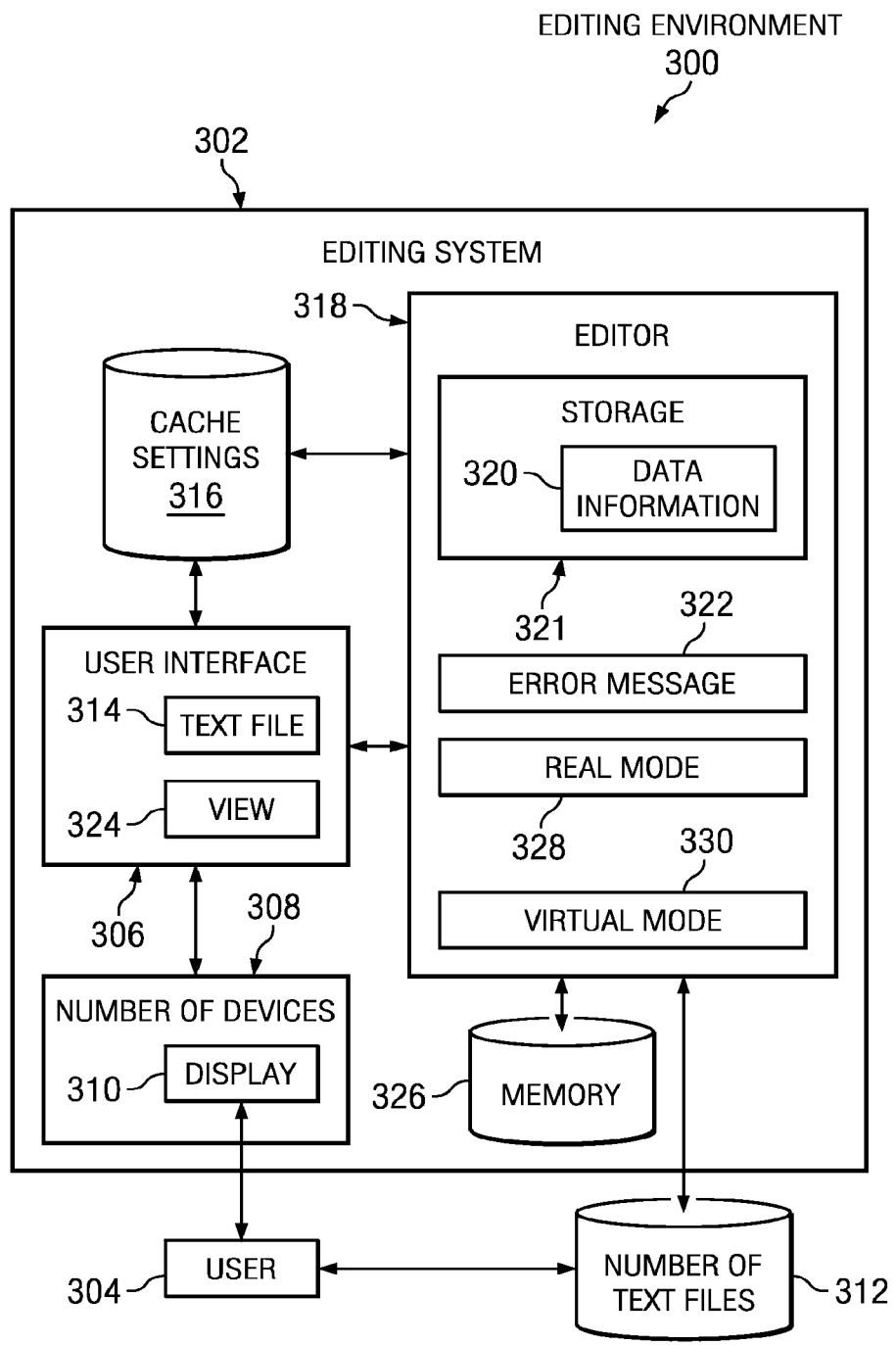
FIG. 3 is an illustration of an editing environment in accordance with an advantageous embodiment.

With reference now to FIG. 3, an illustration of an editing environment is depicted in accordance with an advantageous embodiment. Editing environment 300 may be implemented in an environment such as network data processing system 100 in FIG. 1, for example.

Editing environment 300 includes editing system 302. User 304 interacts with editing system 302 via user interface 306 using number of devices 308. Number of devices 308 may include, for example, display 310. User 304 may select a text file from number of text files 312 to load and edit using editing system 302. Number of text files 312 may include, for example, without limitation, columnar text files. The text file selected by user 304 may be received by editing system 302 as input, such as text file 314. Number of text files 312 may include text files that are larger than available memory of a data processing system into which number of text files 312 are to be loaded, for example.

Cache settings 316 include pre-defined settings such as, for example, without limitation, number of cached pages, maximum number of rows per cache page, and maximum number of columns per cache page. The pre-defined settings in cache settings 316 may be configured by a user, such as user 304, for example. Cache settings 316 may also be customized by user 304 during loading and editing operations by editing system 302.

Editor 318 identifies text file 314 and determines whether it is a columnar text file. A columnar text file may be, for example, without limitation, a comma separated values (CSV) text file, a tab separated values (TSV) text file, and/or any other suitable columnar text file. If text file 314 is a columnar text file, editor 318 identifies data information 320 associated with text file 314 by using a pre-defined normalization process, discussed in further detail in FIG. 4. In one advantageous embodiment, data information 320 is located in storage 321 and associated with text file 314. Storage 321 may be, for example, without limitation, global variables, temporary intermediate files, and/or any other suitable storage device. A global variable is a variable that is accessible and effective throughout every scope of an application. Data information 320 may include, for example, without limitation, the total number of rows and total number of columns of text file 314.

In an illustrative example, if data information 320 associated with text file 314 indicates the total number of columns for text file 314 is greater than the maximum number of columns setting identified in cache settings 316, editor 318 may generate error message 322. Error message 322 may be sent to user 304 via user interface 306, prompting user 304 to reconfigure cache settings 316 for a start-over, in this example.

Editor 318 includes real mode 328 and virtual mode 330. Editor 318 determines which mode should be used to load text file 314 for display in view 324 based on the size of text file 314, the size of memory 326, and cache settings 316. In one illustrative example, memory 326 may have a size of four gigabytes (4 GB), text file 314 may have a size of six gigabytes (6 GB) containing four million rows of text data, and cache settings 316, for example, may indicate "MAX_ROW_NUMBER=20,000", "MAX_COLUMN_NUMBER=100", and "NUMBER_CACHED_PAGES=2". In this illustrative example, each section of 20,000 rows of data may be one segment of data, and each segment of data may be a cached page, so that 200 cached pages are generated to process the total number of rows of text data in text file 314. Editor 318 determines whether the total number of rows for text file 314 is greater than the product of the number of cached pages multiplied by the maximum number of rows per cache page in cache settings 316. In this example, the total number of rows for text file 314 is four million rows. Editor 318 multiplies the number of cached pages, in this example two cached pages, by the maximum number of rows per cache page, in this example 20,000 rows, to obtain the product of 40,000 rows (2×20,000=40,000 rows).

If editor 318 determines the total number of rows for text file 314 is greater than the product of the number of cached pages multiplied by the maximum number of rows per cache page, editor 318 uses virtual mode 330 to load and edit data from text file 314. Otherwise, editor 318 uses real mode 328 to load and edit data. Editor 318 loads the data into view 324 for viewing and editing by user 304. View 324 may be, for example, without limitation, a spreadsheet view.

The illustration of editing environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments.

Also, the blocks are presented to illustrate some functional components. One or more of these blocks may be combined and/or divided into different blocks when implemented in different advantageous embodiments.

Figure 4:
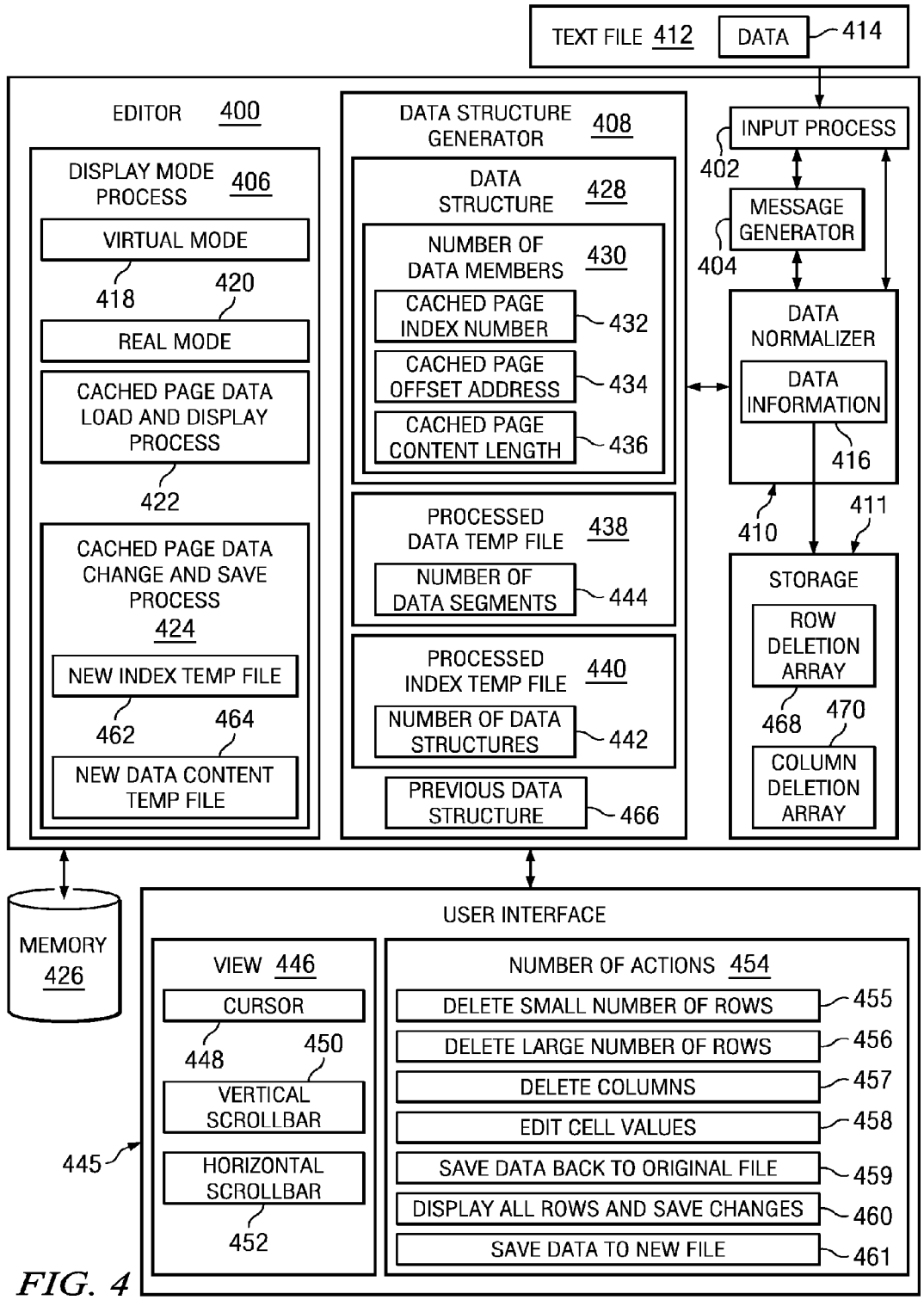
FIG. 4 is an illustration of an editor in accordance with an advantageous embodiment.

With reference now to FIG. 4, an illustration of an editor is depicted in accordance with an advantageous embodiment. Editor 400 is an illustrative example of one implementation of editor 318 in FIG. 3.

Editor 400 includes input process 402, message generator 404, display mode process 406, data structure generator 408, and data normalizer 410. Input process 402 identifies input, such as text file 412, and determines whether text file 412 is a valid columnar text file. Text file 412 may be an illustrative example of one implementation of text file 314 in FIG. 3. Input process 402 identifies data 414 of text file 412 and data information 416 associated with text file 412. Data 414 may be lines of text data, for example. Data information 416 may be the total number of rows and total number of columns for text file 412, for example. Input process 402 passes data 414 to data normalizer 410 line by line, and data normalizer 410 generates data information 416 associated with data 414. Data information 416 may also be stored in storage 411. Storage 411 may be an example of one implementation of storage 321 in FIG. 3.

Input process 402 identifies cache settings associated with editor 400, such as cache settings 316 in FIG. 3, to determine the number of cached pages, the maximum number of columns, and the maximum number of rows for each cached page. Input process 402 uses the cache settings and data information 416 associated with text file 412 to determine whether data 414 of text file 412 fits within pre-defined cache settings. If data 414 of text file 412 exceeds the cache settings, input process 402 sends an error signal to message generator 404. Message generator 404 generates an error message, such as error message 322 in FIG. 3, to alert a user to a need for customizing cache settings.

If data 414 fits within the pre-defined cache settings, input process 402 sends a signal to message generator 404 to generate a message and prompt a user to select whether or not the first row of data 414 is a header row or not. Input process 402 receives the user selection. If the user selects the first row of data 414 to be a header row, input process 402 sets up the first row of data 414 as the header row, and adjusts the total number of rows in data information 416 associated with text file 412 to decrease the total number of rows of data 414 by one.

Display mode process 406 determines whether to load data 414 in virtual mode 418 or real mode 420. In an illustrative example, if the total number of rows of text data for data 414 is greater than the product of the number of cached pages multiplied by the maximum number of rows per cached page specified in cache settings, display mode process 406 selects virtual mode 418. Otherwise, display mode process 406 selects real mode 420, in this example. When virtual mode 418 is selected to load data 414, cached page data load and display process 422 is used to load and display data 414. Virtual mode 418 also uses cached page data change and save process 424 to provide cell editing functions to a user, such as user 304 in FIG. 3.

Virtual mode 418 enables editor 400 to load data 414 when data 414 is at a size greater than memory 426 can support. Display mode process 406 runs simultaneously with data structure generator 408 and data normalizer 410 to process data 414 for display in view 446 via user interface 445. View 446 may be an illustrative example of one implementation of view 324 in FIG. 3.

Data structure generator 408 creates data structure 428 that records number of data members 430. Number of data members 430 may be, for example, without limitation, the index number that records the cached page index number, the offset address that records the starting point of the cached page content stored in a processed data temporary file, the content length that records the data length of the cached page content stored in a processed data temporary file, and/or any other suitable data members. The size of data structure 428 varies according to the type of each of number of data members 430 included in data structure 428. Once the type of each of number of data members 430 is defined, the size of data structure 428 is a fixed value that can be used to reference each data structure stored in a processed index temporary file. Number of data members 430 identify which segment of data editor 400 should load for viewing and/or editing and how editor 400 loads from a processed data temporary file, such as processed data temporary file 438.

In one advantageous embodiment, number of data members 430 may include cached page index number 432, cached page offset address 434, and cached page content length 436. Cached page index number 432 indicates the cached page index number associated with a particular segment of data in processed data temporary file 438. Cached page offset address 434 indicates the starting point of the cached page associated with a particular segment of data in processed data temporary file 438. Cached page content length 436 indicates how many bytes of data that particular segment of data, identified by cached page index number 432 and cached page offset address 434, occupies in processed data temporary file 438. Data structure generator 408 initializes number of data members 430 by assigning "0L" to cached page index number 432, "0L" to cached page offset address 434, and "0L" to cached page content length 436. In an illustrative example, the initial assignment may be represented as:

DATA_STRUCT.index_number=0L

DATA_STRUCT.offset_address=0L

DATA_STRUCT.content_length=0L

Data structure generator 408 also creates processed data temporary file 438 and processed index temporary file 440. Processed data temporary file 438 stores number of data segments 444. Processed index temporary file 440 stores number of data structures 442. Data structure 428 may be an illustrative example of one data structure of number of data structures 442.

Data structure generator 408 opens text file 412 in a read only file input/output mode, and sets the beginning of text file 412 as the current reading position. The current reading position at the first open file operation of text file 412 is the beginning of the first row of text data. In an illustrative example, text file 412 may include a total number of four million rows of text data. Cache settings may indicate that the maximum number of rows per cached page is 20,000 rows of text, in this example. Data structure generator 408 will read the maximum number of rows at a time from the original input, text file 412, moving the current reading position to a position at which the reading operation is finished after each reading operation is completed. In an illustrative example, data structure generator 408 reads the first 20,000 rows of text data, simultaneous to data normalizer 410 normalizing the first 20,000 rows of text data, discussed in more detail below. After the first 20,000 rows of text data are read and normalized, data structure generator 408 moves the current reading position to the end of the first 20,000 rows of text data, and saves the first 20,000 rows of text data normalized as a first data segment in number of data segments 444 of processed data temporary file 438, in this example. Data structure generator 408 will also save a first data structure in number of data structures 442 of processed index temporary file 440, which is associated with the first data segment in this example. The first data structure may indicate an index number to reference the first data segment, an offset address to locate the first data segment, and a content length to reference the data length of the first data segment. In an illustrative example, the data member assignments of the first data structure may be represented as below, assuming the data length of the first data segment is 3.5 MB:

DATA_STRUCT.index_number=1*L*

DATA_STRUCT.offset_address=0*L*

DATA_STRUCT.content_length=3,500,000*L*

The data members of the first data structure in this example now contain information that editor 400 can use to locate the first data segment for loading and editing when a row of text data located in the first data segment is selected by a user, such as user 304 in FIG. 3, for example. Editor 400 will identify the first data segment in number of data segments 444 of processed data temporary file 438 using cached page index number 432, which indicates "1L" in the above illustrative example, to locate the first data segment. Editor 400 will identify a starting point for the read process using cached page offset address 434, which indicates "0L" because it is the first data segment and therefore the beginning of text file 412 in this example. Editor 400 will identify the number of bytes of data to read during the reading operation using cached page content length 436, which indicates "3,500,000L" in this example.

Data structure generator 408 may then read the maximum number of rows from the current reading position, which was moved after the first reading operation of the first 20,000 rows, to read the second 20,000 rows of text data. Data structure generator 408 reads the second 20,000 rows of text data, simultaneous to data normalizer 410 normalizing the second 20,000 rows of text data, and again moves the current reading position to the end of the second 20,000 rows of text data after the reading and normalizing operations are complete. Data structure generator 408 then saves the second 20,000 rows of text data normalized as a second data segment in number of data segments 444 of processed data temporary file 438, in this example. Data structure generator 408 will also save a second data structure in number of data structures 442 of processed index temporary file 440, which is associated with the second data segment in this example. The second data structure indicates an index number to reference the second data segment, an offset address to locate the second data segment, and a content length to reference the data length of the second data segment. In an illustrative example, the data member assignments of the second data structure may be represented as below, assuming the data length of the second data segment is 3.6 MB:

DATA_STRUCT.index_number=2*L*

DATA_STRUCT.offset_address=3,500,000*L*

DATA_STRUCT.content_length=3,600,000*L*

Editor 400 can use the second data structure to locate the second data segment for loading and editing. Editor 400 will identify the second data segment in number of data segments 444 of processed data temporary file 438 using cached page index number 432, which indicates "2L" in the above illustrative example, to locate the second data segment. Editor 400 will identify a starting point for the read process using cached page offset address 434, which indicates "3,500,000L" because it is where the first data segment ends and therefore the beginning of the second data segment in this example. Editor 400 will identify the number of bytes of data to read during the reading operation using cached page content length 436, which indicates "3,600,000L" in this example.

Editor 400 may continue to process text file 412 until it reaches the end of text file 412. Data structure generator 408 saves the read and normalized rows of text by appending them to the end of the previously saved number of data segments 444. Data structure generator 408 saves the data structures created by appending them to the end of the previously saved number of data structures 442.

Data normalizer 410 identifies any unreadable characters within data 414, normalizes the unreadable characters by replacing unreadable characters with pre-defined characters to prevent load errors, validates each line of text data in data 414 into column-ready rows of text data, and retrieves the total number of columns for data information 416 associated with data 414. Data normalizer 410 normalizes each line of text data by determining whether a delimiter character is a valid delimiter or indented to be part of the readable text. In an illustrative example, where text file 412 is a comma separated values (CSV) file, a comma character is the delimiter for data 414 to divide text between columns in a spreadsheet view. In this example, some of the comma characters may be delimiters and some of the other comma characters may be punctuation in the text. Data normalizer 410 identifies double quotation mark characters around a number of the potentially delimiting characters, such as a comma in the above example, and determines that the number of potentially delimiting characters should not be recognized as a delimiter when double quotation marks are present. All other potentially delimiting characters without double quotation marks are recognized by data normalizer 410 as delimiters. Data normalizer 410 validates the total number of columns for data information 416 associated with data 414 once the number of potentially delimiting characters have been determined as either valid delimiters or non-valid delimiters.

Cached page data load and display process 422 loads and displays data from text file 412 when virtual mode 418 is selected by display mode process 406. Cached page data load and display process 422 initially sets the current focus row to the first row of text data in processed data temporary file 438. Cached page data load and display process 422 sets the number of cached pages to be loaded into memory 426 at a time for display in view 446, for example. In an illustrative example, the number of cached pages may be set as: "NUMBER_CACHED_PAGES=2." Cached page data load and display process 422 initializes the first two cached pages for display in view 446 by reading from processed data temporary file 438 the first row of text data to the maximum row number of text data as the first cached page content, and the first row after the last row read into the first cached page to the maximum row number of text data as the second cached page content. In an illustrative example, where the maximum row number per cached page is 20,000 rows of text data, the first cached page content is row 1 through row 20,000 and the second cached page content is row 20,001 through row 40,000.

Cached page data load and display process 422 initializes view 446 with the total number of rows and total number of columns from data information 416 associated with data 414. Cached page data load and display process 422 sets the cached page index numbers and loads and displays all cached pages into view 446. In the illustrative example where "NUMBER_CACHED_PAGES=2," cached page data load and display process 422 sets the index page numbers as:

FIRST_PAGE_INDEX_NUM=1$L$

SECOND_PAGE_INDEX_NUM=FIRST_PAGE_INDEX_NUM+1$L$

Cached page data load and display process 422 highlights the first cell of the current focus row in the viewable zone of view 446. Cursor 448 indicates the current focus row in the viewable zone of view 446. A user, such as user 304 in FIG. 3, may then scan data 414 in view 446 using vertical scrollbar 450, horizontal scrollbar 452, and/or cursor 448.

If the current focus row selected by a user, as indicated by cursor 448 or by vertical scrollbar 450, is within the range of the number of cached pages currently in view 446, then no additional load/unload operations are needed. In an illustrative example, the row range of the number of cached pages currently in view 446 may be determined by cached page data load and display process 422 using the following equation:

(((FIRST_PAGE_INDEX_
    NUM−1)*MAX_ROW_NUM)+1) to (((SECOND_PAGE_INDEX_
    NUM−1)*MAX_ROW_NUM)*2)

If the current focus row selected by a user is not within the range of the number of cached pages currently in view 446, cached page data load and display process 422 determines the first page index number and second page index number for the desired rows of data using the following equation:

FIRST_PAGE_INDEX_NUM=CEILING(CUR-
    RENT_FOCUS_ROW/MAX_ROW_NUM);

SECOND_PAGE_INDEX_NUM=FIRST_PAGE_INDEX_NUM+1$L$

Cached page data load and display process 422 determines the first page index number and second page index number and retrieves the data index for the first cached page desired from processed index temporary file 440. The offset address is set to start reading data from processed index temporary file 440 using the following equation, assuming the size of index data structure as SIZE_DATA_STRUCT:

((FIRST_PAGE_INDEX_NUM−1$L$)*SIZE_
    DATA_STRUCT)

Cached page data load and display process 422 reads number of bytes of data, as indicated by the data structure size which is a fixed value represented as SIZE_DATA_STRUCT, from processed index temporary file 440, and assigns the read data to a data structure. Cached page data load and display process 422 sets the offset address to start reading data from processed data temporary 438, as indicated by the data member cached page offset address 434. Cached page data load and display process 422 sets the number of bytes of data to be read from processed data temporary file 438, as indicated by the data member cached page content length 436. Cached page data load and display process 422 retrieves the content for the first cached page from processed data temporary file 438 and loads it as the first cached page for display in view 446. Cached page data load and display process 422 then retrieves the content for the second cached page using the same steps as executed for the first cached page.

Cached page data change and save process 424 changes cell values and saves data changes made to data 414 in virtual mode 418. Cursor 448 may be moved to a specific cell in view 446 by a user, such as user 304 in FIG. 3. Cached page data load and display process 422 loads and displays the data content for the desired cell. If a user would like to edit data 414 in virtual mode 418, the user may select number of actions 454 via user interface 445. Number of actions may include, for example, without limitation, delete small number of rows 455, delete large number of rows 456, delete columns 457, edit cell values 458, save data back to original file 459, display all rows and save changes 460, save data to new file 461, and/or any other suitable action.

In one illustrative example, a user may select delete small number of rows 455 whenever the user intends to delete a small number of rows. A small number of rows may be any number of rows between one to the product of the number of cached pages multiplied by the maximum number of rows per cached page, represented as: 1 to (NUMBER_CACHED_PAGES×MAX_ROW_NUM). A user may select the rows for deletion using cursor 448, for example, before selecting delete small number of rows 455. Delete small number of rows 455 highlights the selected rows in view 446 and stores each selected row index number into row deletion array 468 for later reference. The row selection for delete small number of rows 455 is not limited to continuous selection, and a user may also select multiple non-contiguous rows by use of a control key, for example, before performing the deletion.

In another illustrative example, a user may select delete large number of rows 456. A large number of rows may be any number of rows greater than the product of the number of cached pages multiplied by the maximum number of rows per cached page, represented as: NUMBER_CACHED_PAGES×MAX_ROW_NUM. The row selection for delete large number of rows 456 is limited to continuous selection. A user may select a starting row and an ending row for deletion. Delete large number of rows 456 removes the number of rows selected directly from view 446 and re-organizes the contents of processed data temporary file 438 and processed index temporary file 440 accordingly. More detail is provided for the operation of delete large number of rows 456 in FIG. 12.

In yet another illustrative example, a user may select delete columns 457. Delete columns 457 highlights the selected columns in view 446 and stores each selected column index number into column deletion array 470 for later reference. The column selection for delete columns 457 is not limited to continuous selection, and a user may also select multiple non-contiguous columns by use of a control key, for example, before performing the deletion.

In another illustrative example, where a user desires to edit the data within a specific cell, the user may select edit cell values 458 from number of actions 454. Selection of edit cell values 458 activates a cell change operation of cached page data change and save process 424. Upon selection of edit cell values 458, cached page data change and save process 424 extracts the number of cached pages of data content from within the specific cell the user desires to change and switches from virtual mode 418 to real mode 420. Cached page data change and save process 424 displays the extracted data content in view 446 using real mode 420, and waits for the user to perform cell value changes and indicate changes are complete. A user may indicate that cell value changes are complete by selecting display all rows and save changes 460 from number of actions 454. Display all rows and save changes 460 may only be selectable after a selection of edit cell values 458, in an illustrative example.

Upon selection of display all rows and save changes 460, cached page data change and save process 424 creates new index temporary file 462 and new data content temporary file 464 for writing. Cached page data change and save process 424 opens processed index temporary file 440 for reading and sets the current reading position as the beginning of processed index temporary file 440. Cached page data change and save process 424 opens processed data temporary file 438 for reading and sets the current reading position as the beginning of processed data temporary file 438. Cached page data change and save process 424 also uses data structure generator 408 to create an index data structure instance named previous data structure 466, represented as PREV_DATA_STRUCT. Previous data structure 466 is initialized with the following equations:

PREV_DATA_STRUCT.index_number=0L;

PREV_DATA_STRUCT.offset_address=0L;

PREV_DATA_STRUCT.content_length=0L;

Cached page data change and save process 424 reads a number of bytes of data, as indicated by the size of data structure 428, from processed index temporary file 440, moves the current reading position to the end of this read data segment, and assigns this number of bytes of data read to an index data structure instance named current data structure, represented as "DATA_STRUCT". Cached page data change and save process 424 determines whether the data member index number of the current data structure is equal to the index number of the first cached page or the index number of the second cached page currently in view 446. If the data member index number of the current data structure is neither equal to the index number of the first cached page nor the index number of the second cached page, cached page data change and save process 424 reads (DATA_STRUCT.content_length) bytes of data, starting reading at (DATA_STRUCT.offset_address), from processed data temporary file 438, and appends this data into new data content temporary file 464. If the data member index number of the current data structure is equal to the index number of the first cached page in view 446, cached page data change and save process 424 appends all the data in the first cached page in view 446 into new data content temporary file 464, and assigns the data length to the data member content length of the current data structure represented as: DATA_STRUCT.content_length=data length of this data appended. If the data member index number of the current data structure is equal to the index number of the second cached page in view 446, cached page data change and save process 424 appends all the data in the second cached page in view 446 into new data content temporary file 464, and assigns the data length to the data member content length of the current data structure represented as: DATA_STRUCT.content_length=data length of this data appended. Cached page data change and save process 424 adjusts the data member offset address of the current data structure as: DATA_STRUCT.offset_address=PREV_DATA_STRUCT.offset_address+PREV_DATA_STRUCT.content_length.

Cached page data change and save process 424 assigns the current data structure to the previous data structure for later reference as the reading operation continues, represented as: PREV_DATA_STRUCT.index_number=DATA_STRUCT.index_number; PREV_DATA_STRUCT.offset_address=DATA_STRUCT.offset_address; PREV_DATA_STRUCT.content_length=DATA_STRUCT.content_length.

Cached page data change and save process 424 appends the current data structure into new index temporary file 462. Cached page data change and save process 424 keeps iterating the operations described above until reading data from processed index temporary file 440 is completed. Cached page data change and save process 424 removes processed data temporary file 438 and processed index temporary file 440, renames new index temporary file 462 to processed index temporary file 440, and renames new data content temporary file 464 to processed data temporary file 438. Cached page data change and save process 424 switches from real mode 420 to virtual mode 418 after new data content temporary file 464 and new index temporary file 462 are renamed to replace processed data temporary file 438 and processed index temporary file 440. Cached page data change and save process 424 displays the number of cached pages of data content in view 446 using virtual mode 418, and waits for other commands from the user, such as user 304 in FIG. 3.

Save data back to original file 459 is only selectable if there has been content change within data 414 in view 446. Selection of save data back to original file 459 saves the data in the view with any changes made, such as small number of rows deletion, column deletion, column re-arrangement, and cell changes, back to the original input text file. Save data back to original file 459 creates a new columnar text file for storing the data in the view, re-organizing the contents of processed data temporary file 438 and processed index temporary file 440 accordingly. When all the data in the view is saved in the new columnar text file completely, save data back to original file 459 removes the original input text file and renames the new columnar text file as the original input text file. More detail is provided for the operation of save data back to original file 459 in FIG. 13.

Selection of save data to new file 461 prompts a user to input a new file name in which the data is to be saved. If there has been content change within data 414 in view 446, the process of save data to new file 461 is similar to the process of save data back to original file 459, except that the original input text file is not removed, but instead the new columnar text file is renamed as the new file name that the user provides. More detail is provided for the operation of save data back to original file 459 in FIG. 13. If there has not been content change within data 414 in view 446, the process of save data to new file 461 is to simply copy the content of the original input text file and to paste it to the new file name that user provides.

The illustration of editor 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
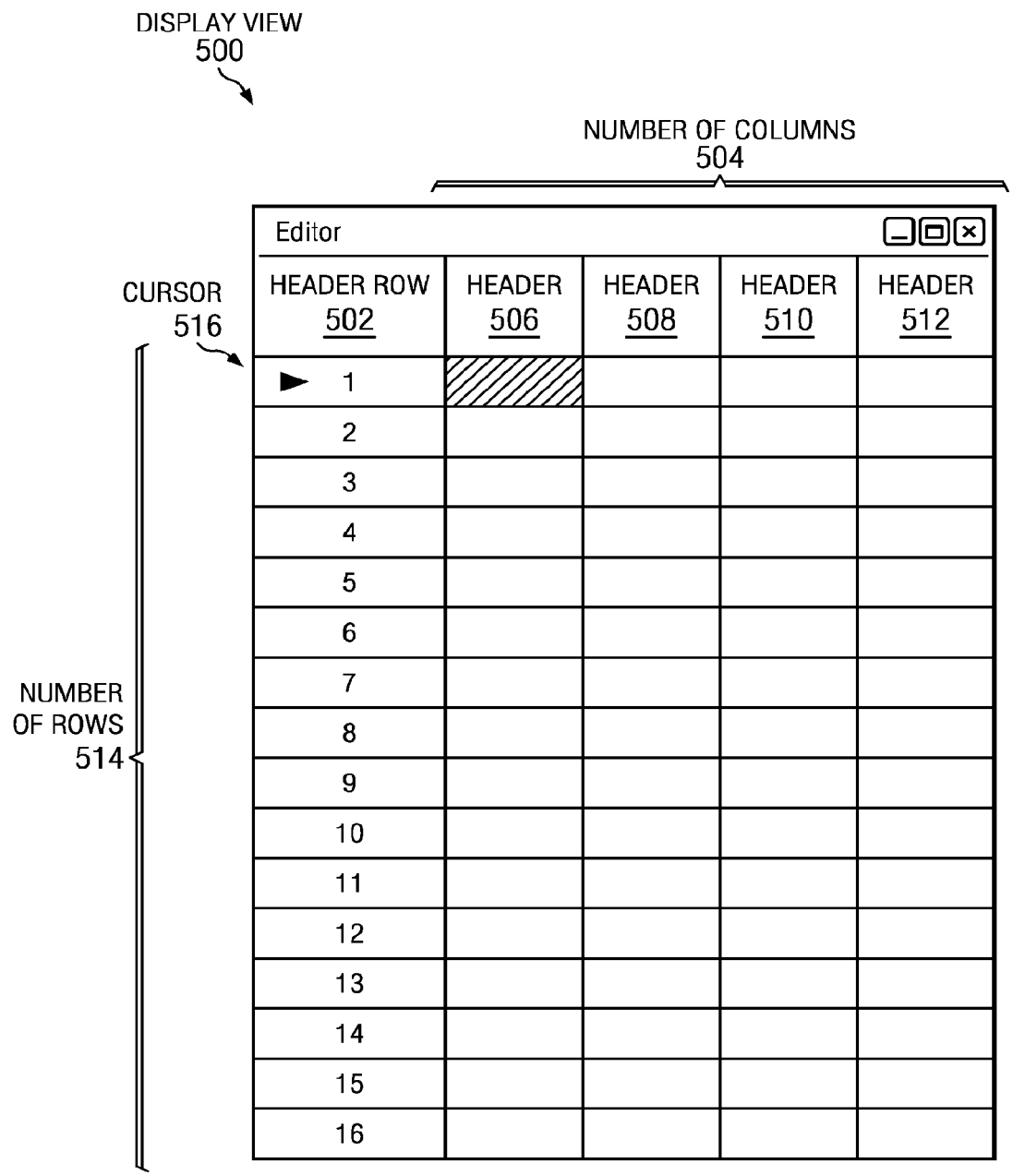
FIG. 5 is an illustration of a display view in accordance with an advantageous embodiment.

With reference now to FIG. 5, an illustration of a display view is depicted in accordance with an advantageous embodiment. Display view 500 is an illustrative example of one implementation of view 322 in FIG. 3 and/or view 446 in FIG. 4.

Display view 500 includes header row 502. Header row 502 may be set up by input process 402 of editor 400 in FIG. 4, for example, in response to a user selection of a first row of information in a text file as header information. Header row 502 may include number of columns 504. Each column in number of columns 504 may have a unique header in header row 502, such as header 506, header 508, header 510, and header 512, for example. Display view 500 also includes number of rows 514. In one illustrative example, cursor 516 may indicate a current focus row. In another illustrative example, a highlighted cell may indicate a current focus row and/or cell, such as the cell under header 506 in the first row of number of rows 514.

The illustration of display view 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
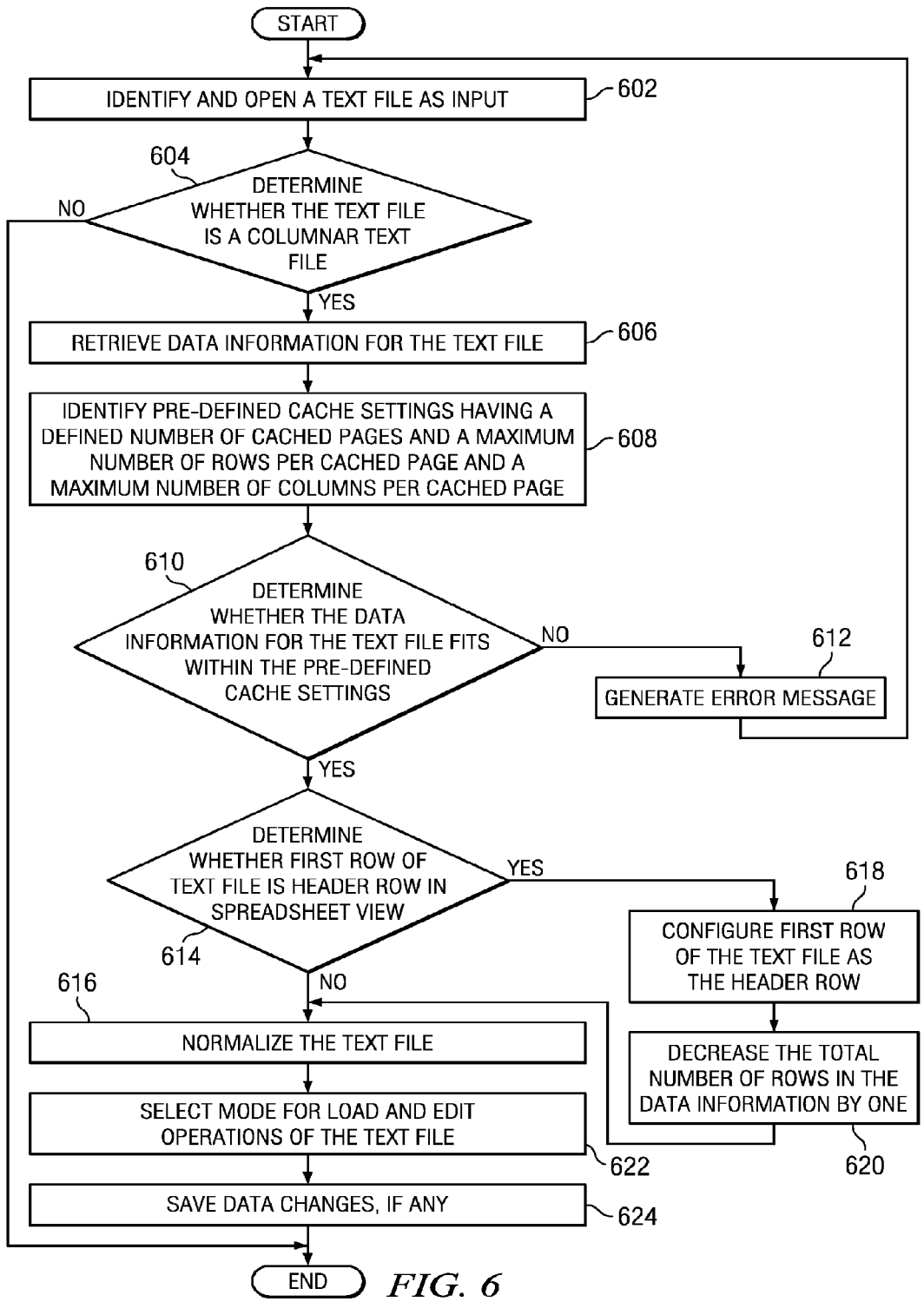
FIG. 6 is an illustration of a flowchart of a process for loading and editing text files in accordance with an advantageous embodiment.

With reference now to FIG. 6, an illustration of a flowchart of a process for loading and editing text files is depicted in accordance with an advantageous embodiment. The process in FIG. 6 may be implemented in a component such as editor 318 in FIG. 3 and/or editor 400 in FIG. 4.

The process begins identifying and opening a text file as input (operation 602). The text file may be received from a user, such as user 304 in FIG. 3 and/or retrieved from a database, such as number of text file 314 in FIG. 3. Input process 402 may be used by editor 400 to open the text file, for example.

The process determines whether the text file is a columnar text file (operation 604). In one illustrative example, the process may look for delimiting characters, such as commas in a comma separated values (CSV) file or tabs in a tab separated values (TSV) file, to determine whether the text file is a columnar text file. If a determination is made that the text file is not a columnar text file, the process ends. If the process determines that the text file is a columnar text file, the process then retrieves data information for the text file (operation 606). The data information may be retrieved concurrently with the data normalization process. The data information may include, for example, without limitation, the total number of rows and total number of columns of the input text file.

The process identifies pre-defined cache settings having a defined number of cached pages and a maximum number of rows per cached page and a maximum number of columns per cached page (operation 608). The pre-defined cache settings may be retrieved from a data source, such as cache settings 316 in FIG. 3, for example. The pre-defined cache settings may include, for example, without limitation, the number of cached pages used in view 446 in FIG. 4, maximum number of rows per cached page, maximum number of columns per cached page, and/or any other suitable setting. The process then determines whether the data information for the text file fits within the pre-defined cache settings (operation 610). This determination may consider the maximum column number per cache page and maximum row number per cache page designated in cache settings, and compare those settings with the total number of columns and total number of rows identified for the text file using the data information.

If a determination is made that the data information for the text file does not fit within the pre-defined cache settings, the process generates an error message (operation 612), and returns to operation 602. The error message may be sent to a user to prompt the user to reconfigure the cache settings before operation 602 resumes, for example. In an illustrative example, the data information indicating the total number of columns may exceed the maximum number of columns indicated in cache settings, prompting an error message.

If a determination is made that the data information for the text file fits within the pre-defined cache settings, the process determines whether the first row of the text file is a header row in a spreadsheet view (operation 614). The process may prompt an option for a user to choose if the first row of the text file should be a header row or not, with the user's selection resulting in the determination.

If a determination is made that the first row is not a header row, the process normalizes the text file (operation 616). A data normalizer, such as data normalizer 410 in FIG. 4, may be used to replace any unreadable characters with pre-defined characters to prevent load errors and/or validate each line of data into column-ready rows of data by determining whether possible delimiters are valid or not during normalization of the data within the text file.

If a determination is made that the first row is a header row, the process configures the first row as the header row (operation 618) and decreases the total number of rows by one in the data information (operation 620) before proceeding to operation 616.

The process then selects a mode for load and edit operations of the text file (operation 622). The mode may be, for example, a virtual mode or a real mode. The process saves data changes, if any (operation 624), with the process terminating thereafter.

Operation 624 may be optionally used to save data changes made during editing operations provided by operation 622. If no data changes are detected, the process may terminate after operation 622.

Figure 7:
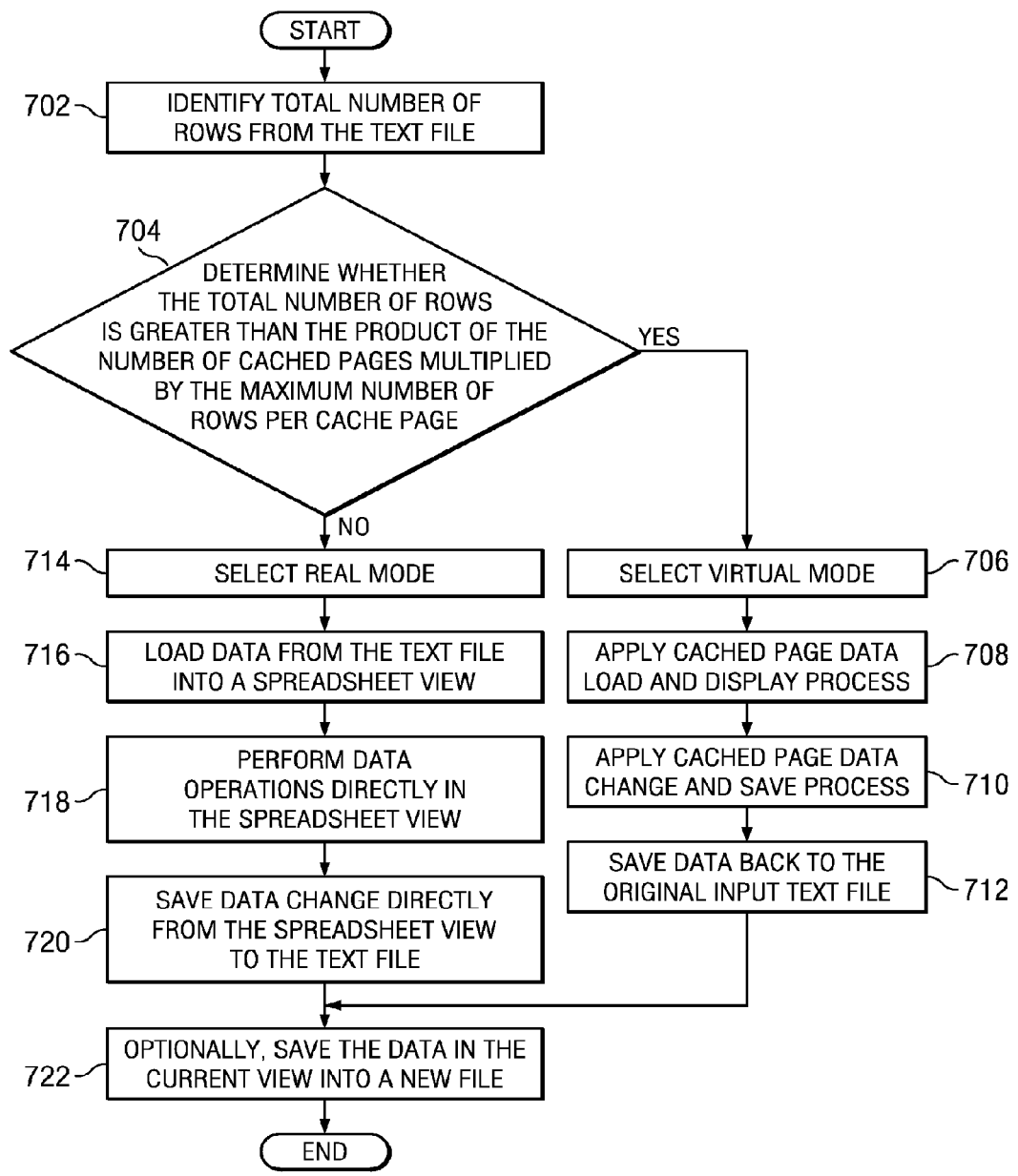
FIG. 7 is an illustration of a flowchart of a process for selecting a view mode in accordance with an advantageous embodiment.

With reference now to FIG. 7, an illustration of a flowchart of a process for selecting a view mode is depicted in accordance with an advantageous embodiment. The process in FIG. 7 may be implemented by a component such as display mode process 406 of editor 400 in FIG. 4.

The process begins by identifying a total number of rows from the text file (operation 702). The process determines whether the total number of rows is greater than the product of the number of cached pages multiplied by the maximum number of rows per cache page (operation 704). The maximum number of rows per cache page may be identified in cache settings 316 in FIG. 3, for example.

If a determination is made that the total number of rows is greater than the product of the number of cached pages multiplied by the maximum number of rows per cache page, the process selects virtual mode (operation 706), applies cached page data load and display process (operation 708), and applies cached page data change and save process (operation 710), and saves data back to the original input text file (operation 712). Data changes may be made by a user via a user interface, such as user 304 via user interface 306 in FIG. 3, for example. In this example, user 304 may select save data back to original file 459 from number of actions 454 in FIG. 4.

If a determination is made that the total number of rows is not greater than the product of the number of cached pages multiplied by the maximum number of rows per cache page, the process selects real mode (operation 714), loads data from the text file into a spreadsheet view (operation 716), performs data operations directly in the spreadsheet view (operation 718), and saves data changes directly from the spreadsheet view to the text file (operation 720). Data changes may be made by a user via a user interface, such as user 304 via user interface 306 in FIG. 3, for example.

The process then optionally saves the data in the current view in a new file (operation 722), with the process terminating thereafter. The process may save the data in a new file when a user selects save data to new file 461 from number of actions 454 in FIG. 4, saving the current view in a new file rather than overwriting the changes back to the original text file, for example.

Figure 8:
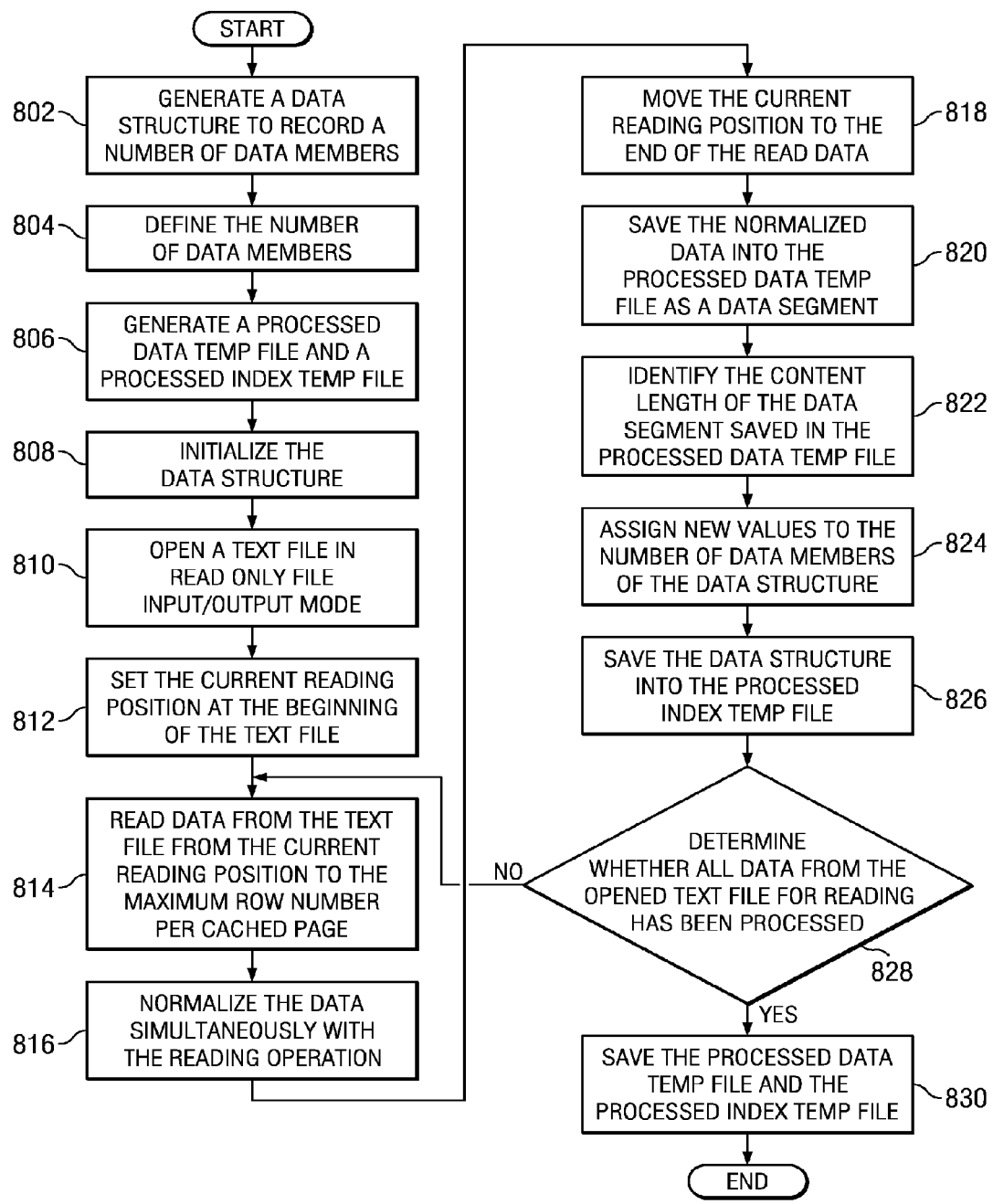
FIG. 8 is an illustration of a flowchart of a process for generating a data structure in accordance with an advantageous embodiment.

With reference now to FIG. 8, an illustration of a flowchart of a process for generating a data structure is depicted in accordance with an advantageous embodiment. The process in FIG. 8 may be implemented by editor 400 in FIG. 4 using data structure generator 408 and/or data normalizer 410, for example.

The process begins by generating a data structure to record a number of data members (operation 802). The number of data members may be, for example, number of data members 430 in FIG. 4.

The process defines the number of data members (operation 804). In an illustrative example, the process may define each data member as LONG data type, and define SIZE_DATA_STRUCT as the size of the data type of the data structure. The process then generates a processed data temporary file and a processed index temporary file (operation 806), such as processed data temporary file 438 and processed index temporary file 440 in FIG. 4, for example. If either of these two files previously exist, the process may destroy them and recreate them in operation 806.

The process then initializes the data structure (operation 808). The process may initialize the data structure by assigning values to each of the number of data members. In an illustrative example, an initialized data structure may be represented as:

DATA_STRUCT.index_number=0L

DATA_STRUCT.offset_address=0L

DATA_STRUCT.content_length=0L

The process then opens a text file in a read only file input/output mode (operation 810) for reading. The process sets the current reading position at the beginning of the text file (operation 812) and reads data from the text file from the current reading position to the maximum row number per cached page (operation 814). The process normalizes the data simultaneously with the reading operation 814 (operation 816). Normalizing the data may include replacing any unreadable characters with pre-defined characters to prevent load errors, identifying potentially delimiting characters, determining whether the delimiting characters are valid, and validating data into column-ready data.

The process moves the current reading position to the end of the read data (operation 818) in the opened text file for reading. The process saves the normalized data into the processed data temporary file as a data segment (operation 820) created in operation 806. The process then identifies the content length of the data segment saved in the processed data temporary file (operation 822) and assigns new values to the number of data members of the data structure (operation 824). In an illustrative example, the process may assign new values using the following equations:

DATA_STRUCT.index_number=DATA_STRUCT.index_number+1L;

DATA_STRUCT.offset_address=DATA_STRUCT.offset_address+DATA_STRUCT.content_length;

DATA_STRUCT.content_length=the content length of the data segment saved;

The process then saves the data structure into the processed index temporary file (operation 826) and determines whether all data from the opened text file for reading has been processed (operation 828). If a determination is made that all data from the opened text file for reading has not been processed, the process returns to operation 814. If a determination is made that all data from the opened text file for reading has been processed, the process saves the processed data temporary file and the processed index temporary file (operation 830), with the process terminating thereafter.

Figure 9:
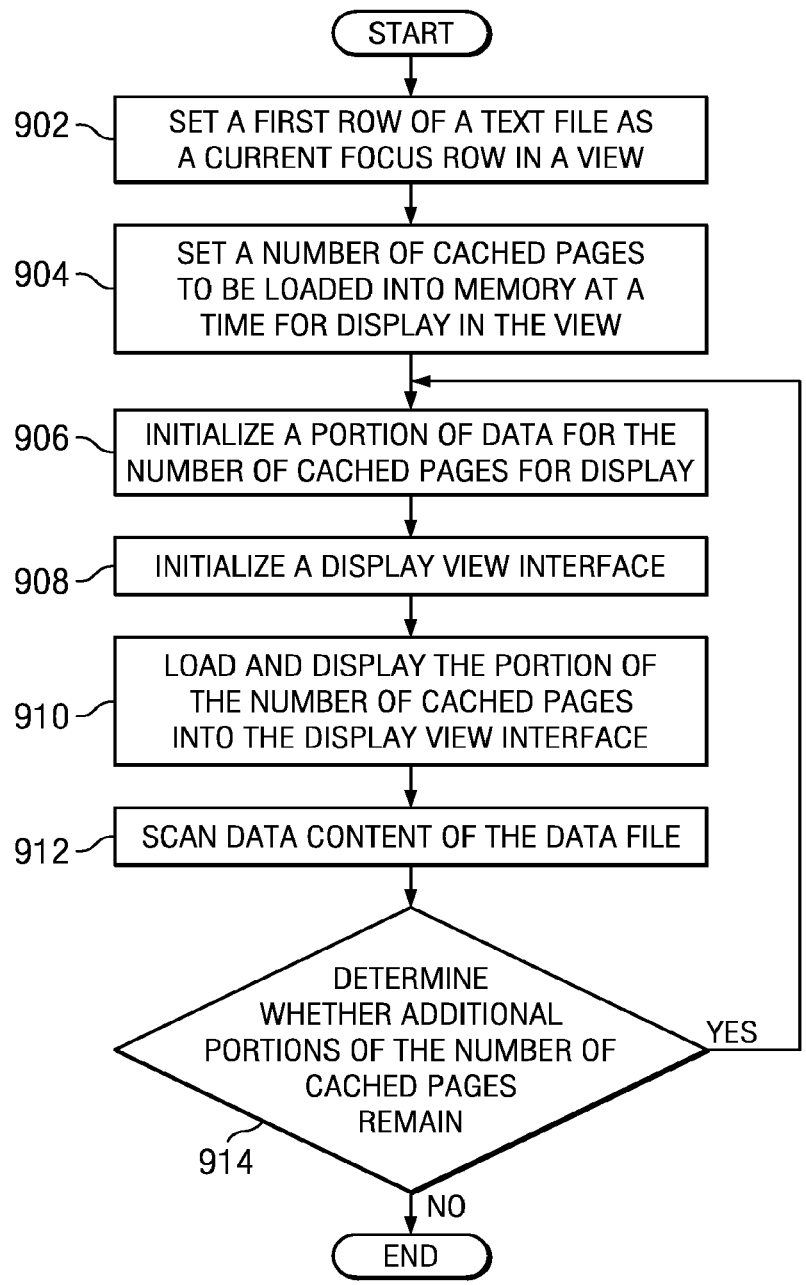
FIG. 9 is an illustration of a flowchart of a process for cached page data load and display in accordance with an advantageous embodiment.

With reference now to FIG. 9, an illustration of a flowchart of a process for cached page data load and display is depicted in accordance with an advantageous embodiment. The process in FIG. 9 may be implemented by a component such as editor 400 in FIG. 4, for example.

The process begins by setting a first row of a text file as a current focus row in a view (operation 902). The view may be, for example, view 324 in FIG. 3 and/or view 446 in FIG. 4. The process sets a number of cached pages to be loaded into memory at a time for display in the view (operation 904). The number of cached pages to be loaded at a time for display may be, without limitation, set as two, for example.

The process initializes a portion of data for the number of cached pages for display (operation 906). The portion of data for the number of cached pages is initialized by reading, from a processed data temporary file, the first row through the maximum row number as the first cached page content and the first row after the maximum row number through the second number of rows equaling the maximum row number as the second cached page content, in an illustrative example where the number of cached pages is set as two.

The process then initializes a display view interface (operation 908). The display view interface may be, for example, without limitation, a spreadsheet-like view interface with the total number of columns and the total number of rows from the text file. In an illustrative example, where the portion of the number of cached pages equals two cached pages, the display view interface may be setup with the first cached page index number and the second cached page index number as:

FIRST_PAGE_INDEX_NUM=1L

SECOND_PAGE_INDEX_NUM=FIRST_PAGE_INDEX_NUM+1L

The process loads and displays the portion of the number of cached pages into the display view interface (operation 910) and scans data content of the text file (operation 912) as selected by a user, such as user 304 in FIG. 3 using cursor 448, vertical scrollbar 450, and/or horizontal scrollbar 452 in FIG. 4, for example. The process then determines whether additional portions of the number of cached pages remain (operation 914). If a determination is made that additional portions of the number of cached pages remain, the process returns to operation 906. If a determination is made that there are no additional portions of the number of cached pages, the process terminates thereafter.

Figure 10:
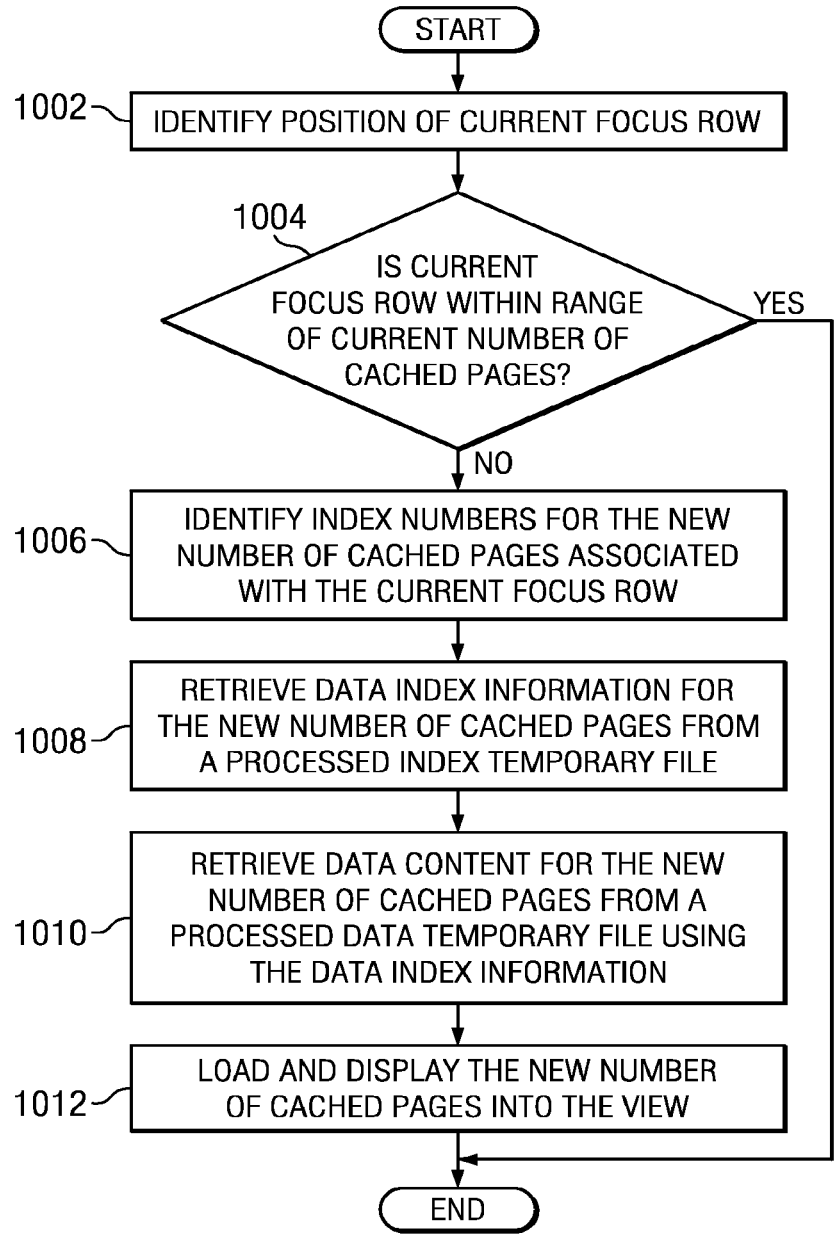
FIG. 10 is an illustration of a flowchart of a process for scanning data content of a text file in accordance with an advantageous embodiment.
Figure 11A:
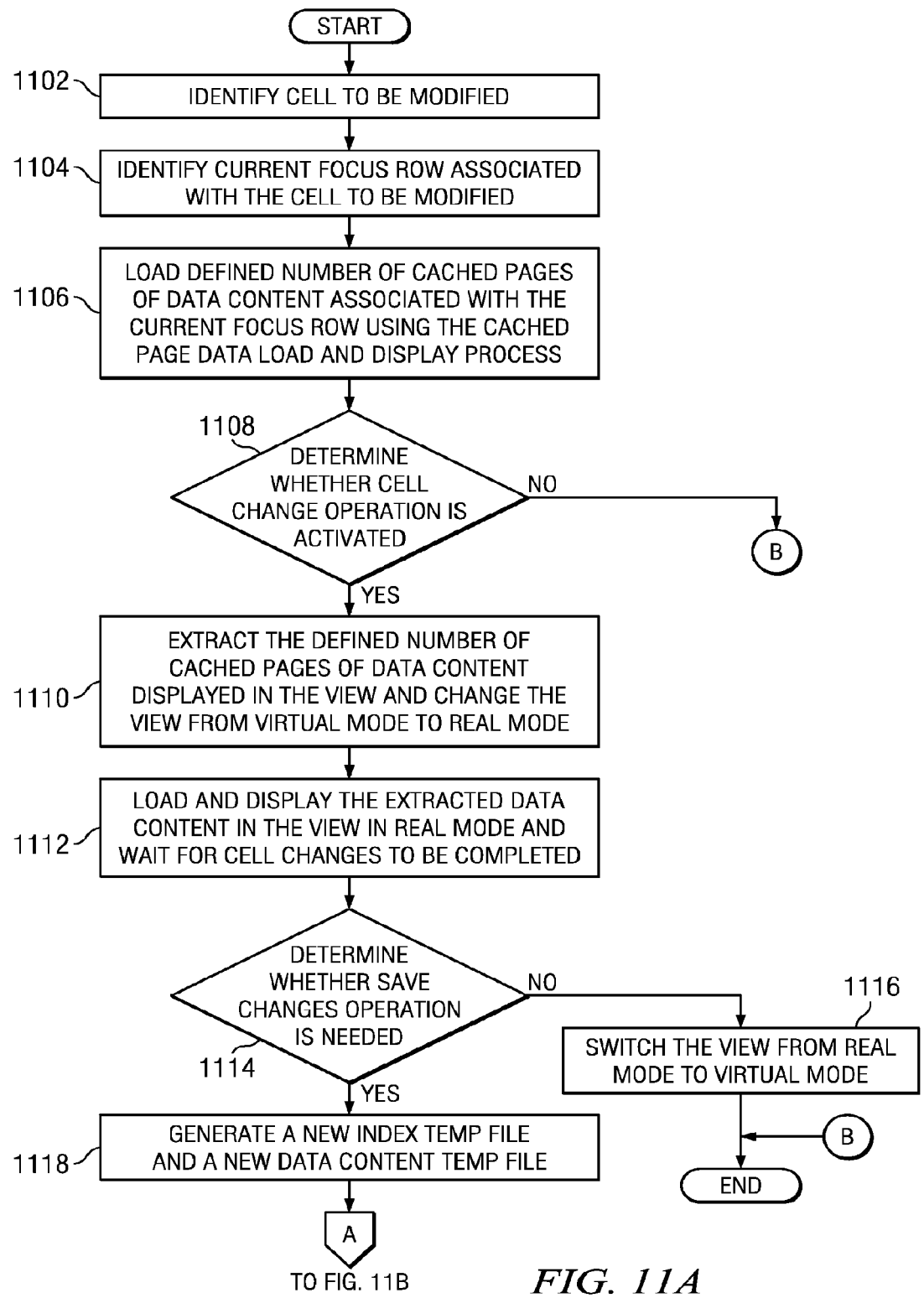
FIGS. 11A-11D are an illustration of a flowchart of a process for cached page data change and save in accordance with an advantageous embodiment.
Figure 11B:
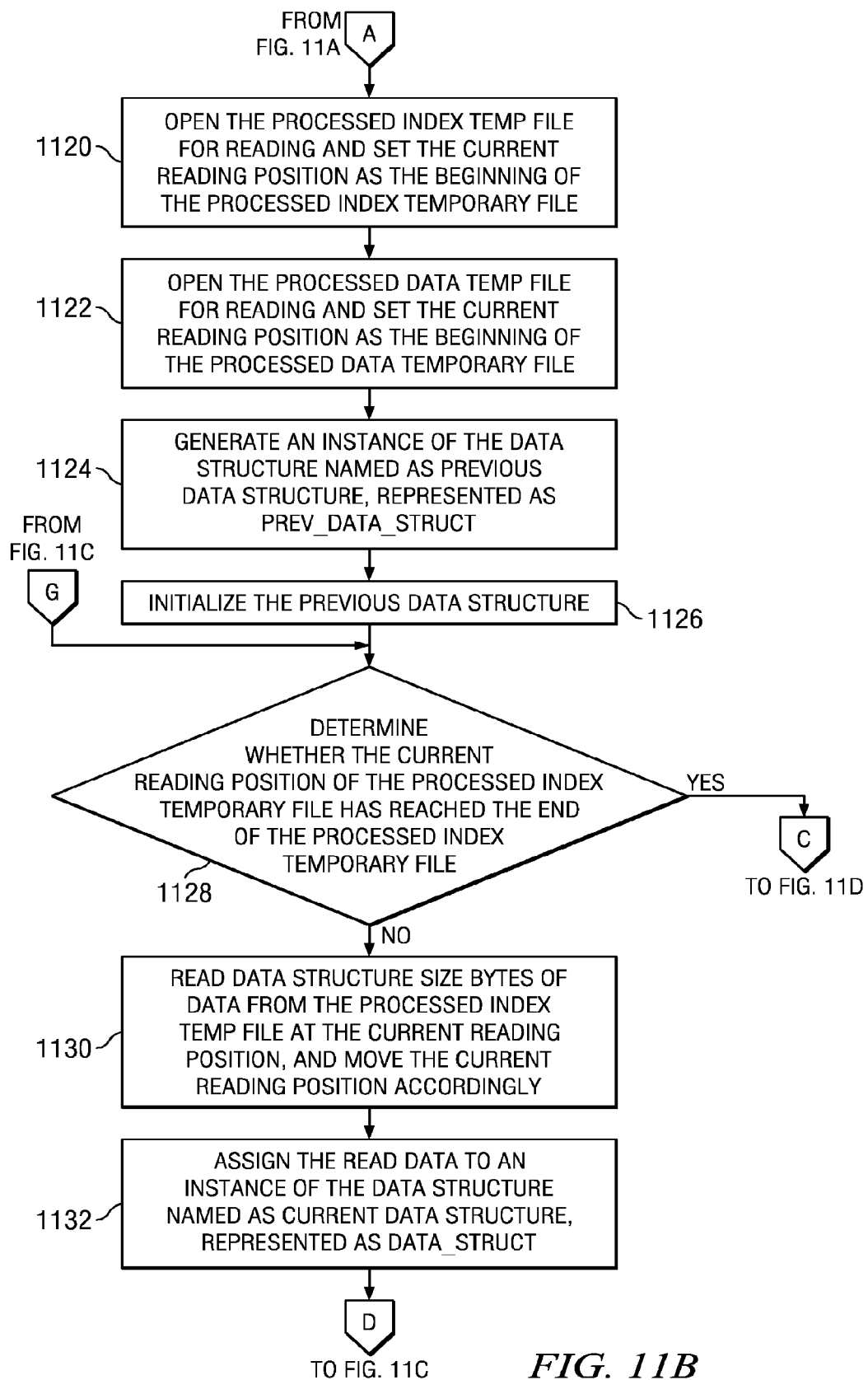
Figure 11C:
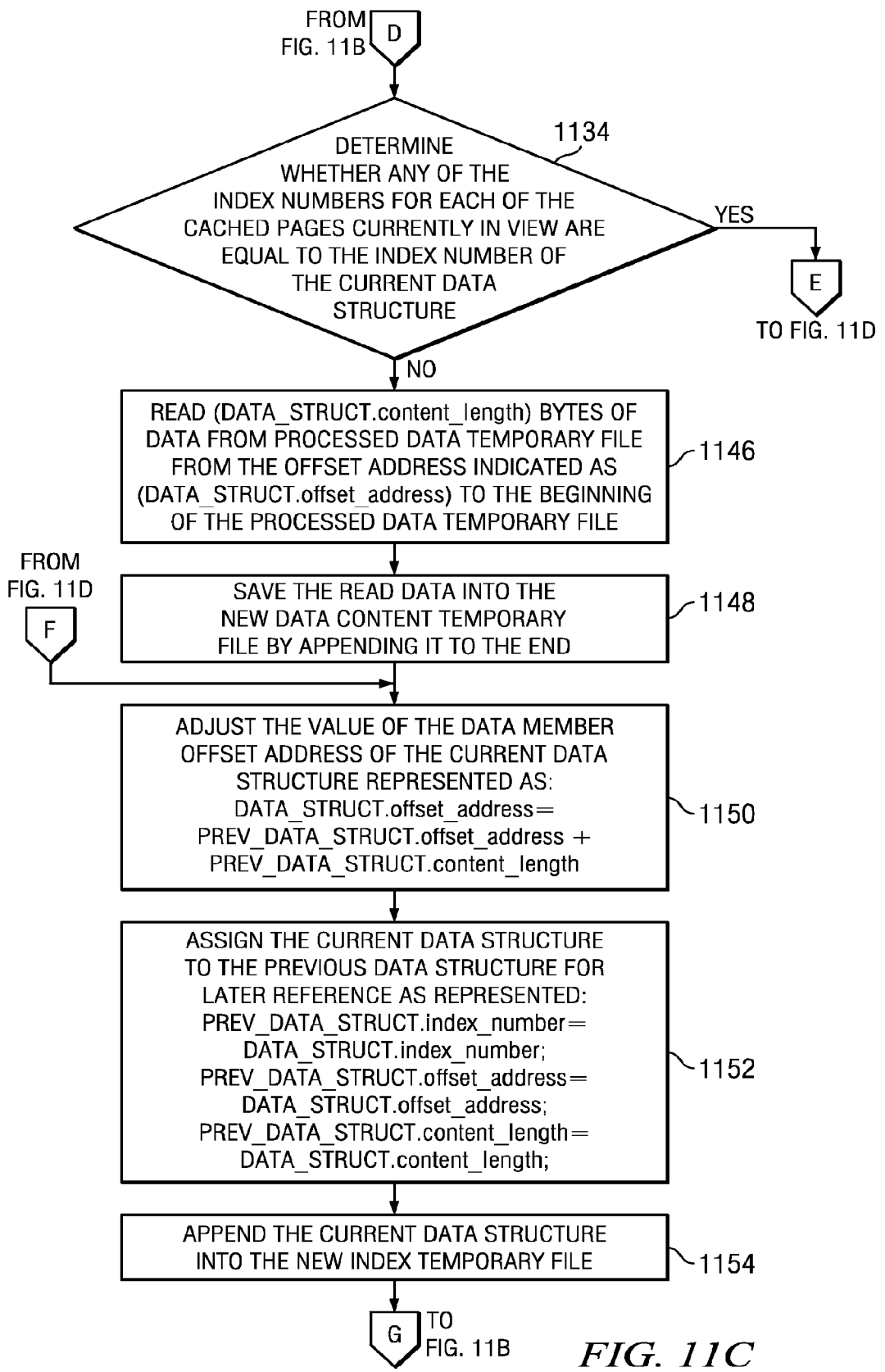
Figure 11D:
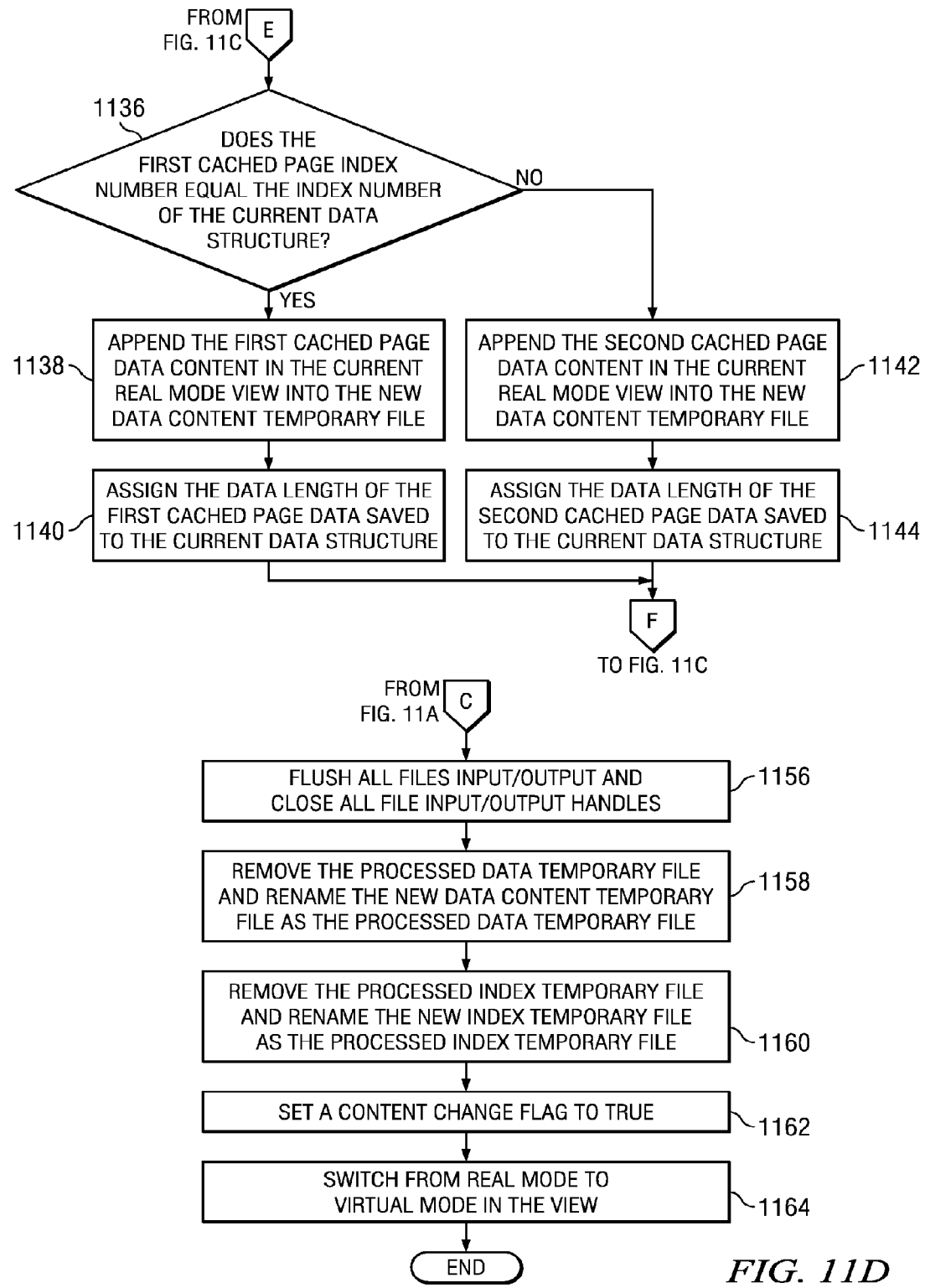
Figure 12A:
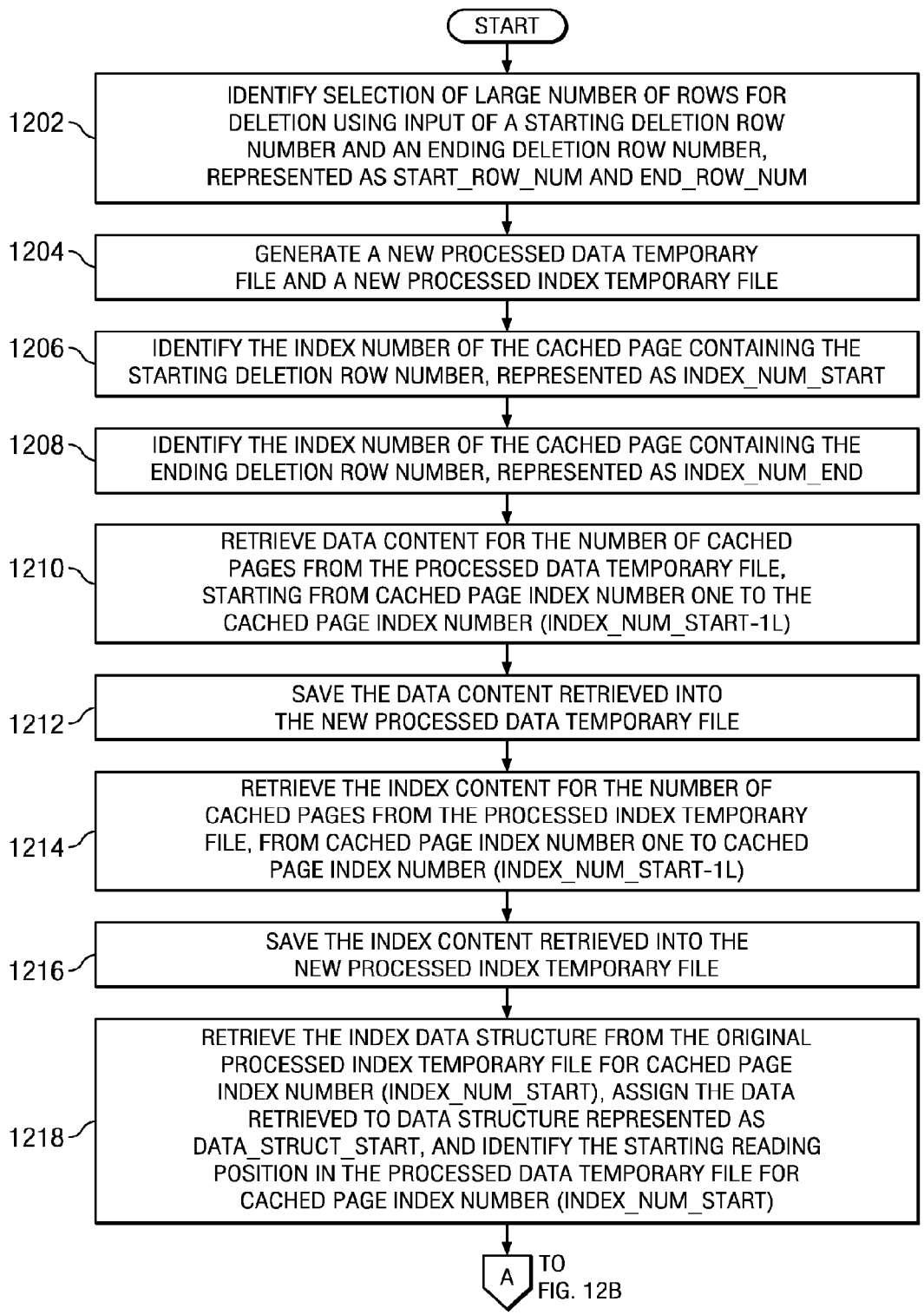
FIGS. 12A-12D are an illustration of a flowchart of a process for deleting a large number of rows in accordance with an advantageous embodiment.
Figure 12B:
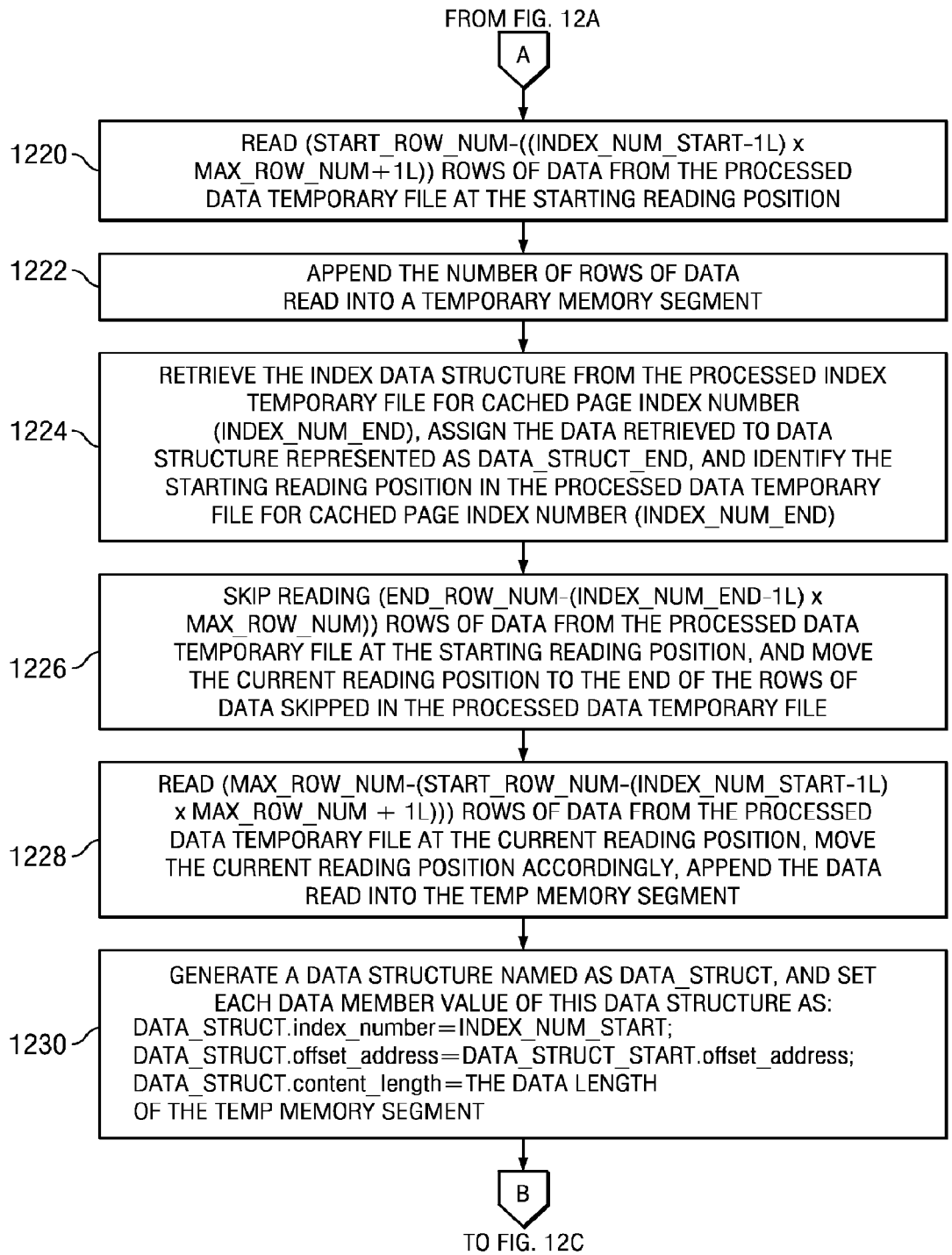
Figure 12C:
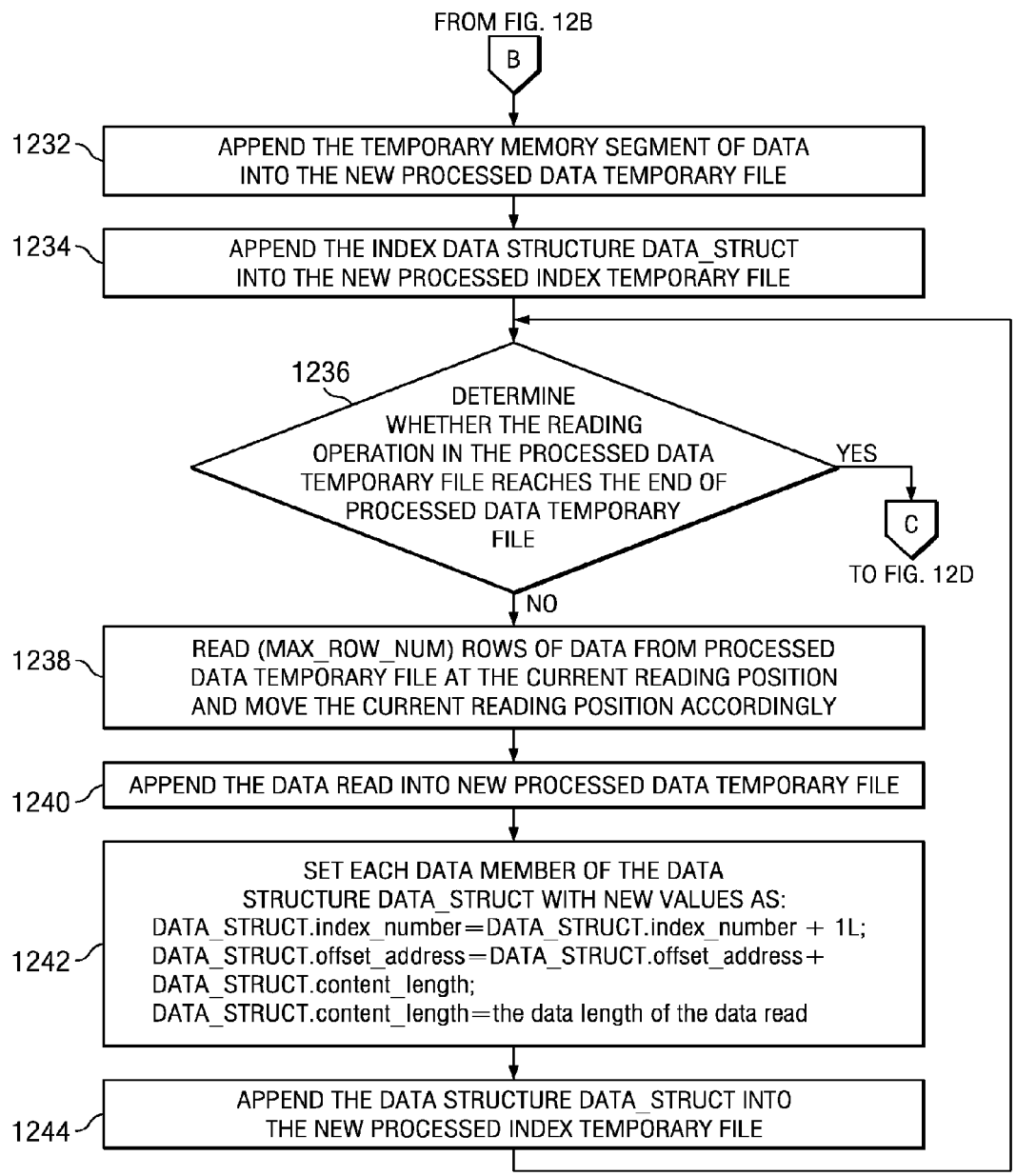
Figure 12D:
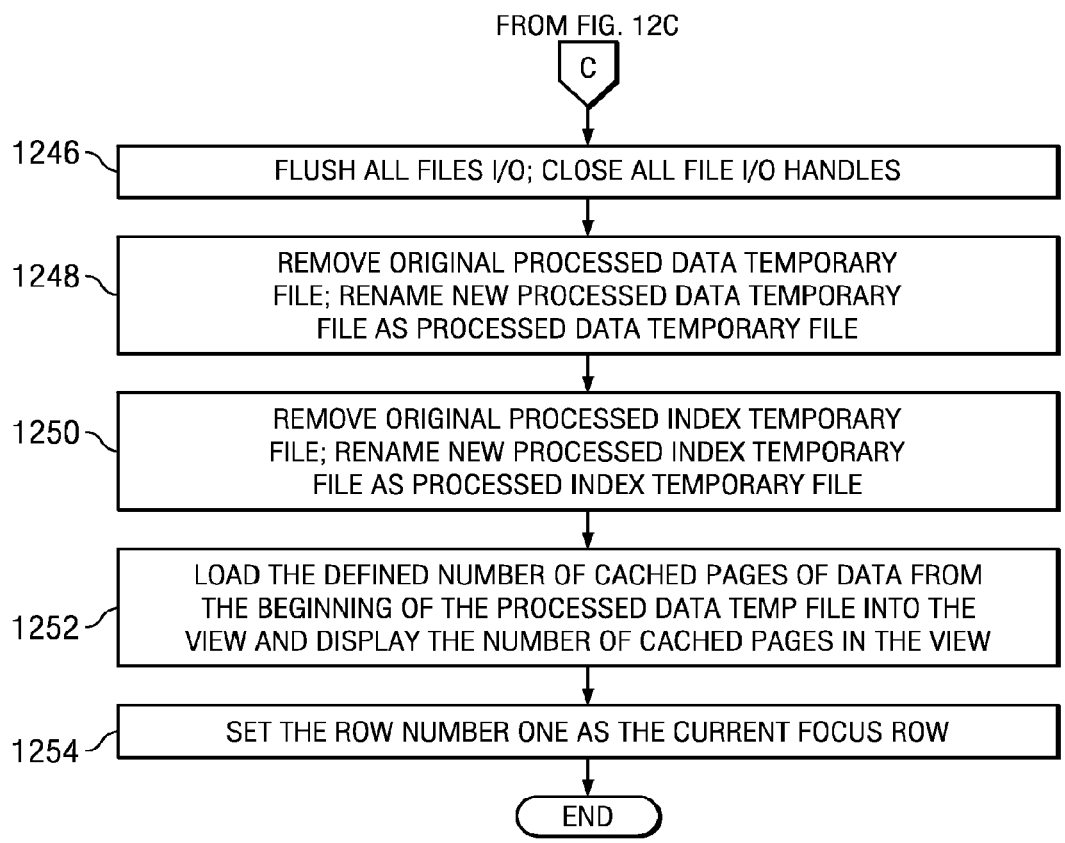

With reference now to FIG. 10, an illustration of a flowchart of a process for scanning data content of a text file is depicted in accordance with an advantageous embodiment. The process in FIG. 10 may be implemented by a component such as editor 400 in FIG. 4, for example.

The process begins by identifying a position of a current focus row (operation 1002). The process determines whether the current focus row is within the range of the current number of cached pages (operation 1004). If a determination is made that the current focus row is within the range of the current number of cached pages, no load/unload operations are needed and the process terminates thereafter. If a determination is made that the current focus row is not within the range of the current number of cached pages, the process identifies index numbers for the new number of cached pages associated with the current focus row (operation 1006). The process retrieves data index information for the new number of cached pages from a processed index temporary file (operation 1008). The process then retrieves data content for the new number of cached pages from a processed data temporary file using the data index information (operation 1010). The process loads and displays the new number of cached pages into the view (operation 1012), with the process terminating thereafter.

With reference now to FIGS. 11A-11D, an illustration of a flowchart of a process for cached page data change and save is depicted in accordance with an advantageous embodiment. The process in FIG. 11 may be implemented by a component such as editor 400 in FIG. 4, for example.

The process begins by identifying a cell to be modified (operation 1102). The cell may be a cell within a spreadsheet-like view, such as display view 500 in FIG. 5, identified by a column and row position, for example. The process identifies a current focus row associated with the cell to be modified (operation 1104). The current focus row may be identified using a cursor, such as cursor 516 in FIG. 5, or using the vertical scrollbar, such as vertical scrollbar 450 in FIG. 4, or by a highlighted row or portion of the row, for example.

The process then loads a defined number of cached pages of data content associated with the current focus row using the cached page data load and display process (operation 1106). The process determines whether a cell change operation is activated (operation 1108). A cell change operation may be activated by a user selecting edit cell values 458 in FIG. 4, for example. If a determination is made that a cell change operation is not activated, the process terminates.

If a determination is made that a cell change operation is activated, the process extracts the defined number of cached pages of data content displayed in the view and changes the view from virtual mode to real mode (operation 1110). The process loads and displays the extracted data content in the view in real mode and waits for cell changes to be completed (operation 1112). The process then determines whether a save changes operation is needed (operation 1114). A save changes operation may be needed if a user selects display all rows and save changes 460 in FIG. 4, for example.

If a determination is made that a save changes operation is no longer needed, the process proceeds to switch the view from real mode to virtual mode (operation 1116), with the process terminating thereafter. If a determination is made that a save changes operation is needed, the process generates a new index temporary file and a new data content temporary file (operation 1118).

The process opens the processed index temporary file for reading and sets the current reading position as the beginning of the processed index temporary file (operation 1120). The process opens the processed data temporary file for reading and sets the current reading position as the beginning of the processed data temporary file (operation 1122). The process then generates an instance of the data structure named as previous data structure, represented as PREV_DATA_STRUCT (operation 1124). The process initializes the previous data structure (operation 1126).

The process determines whether the current reading position of the processed index temporary file has reached the end of the processed index temporary file (operation 1128). If a determination is made that the current reading position of the processed index temporary file reaches the end of the processed index temporary file, then the process proceeds to operation 1156.

If a determination is made that the current reading position of the processed index temporary file does not yet reach the end of the processed index temporary file, then the process reads data structure size bytes of data from the processed index temporary file at the current reading position and moves the current reading position accordingly (operation 1130). The process assigns the data read from the processed index temporary file to an instance of the data structure named as current data structure, represented as DATA_STRUCT (operation 1132). Then the process determines whether any of the index numbers for each of the cached pages currently in the view are equal to the index number of the current data structure (operation 1134). If a determination is made that one of the index numbers of the cached pages currently in the view is equal to the index number of the current data structure, the process then determines whether the first cached page index number is equal to the index number of the current data structure (operation 1136).

If a determination is made that the first cached page index number equals the index number of the current data structure, the process appends the first cached page data content in the current real mode view into the new data content temporary file (operation 1138). The process then assigns the data length of the first cached page saved to the current data structure (operation 1140), and proceeds to operation 1150.

If a determination is made that the first cached page index number does not equal the index number of the current data structure, the process then appends the second cached page data content in the current real mode view into the new data content temporary file (operation 1142). The process then assigns the data length of the second cached page data saved to the current data structure (operation 1144), and proceeds to operation 1150.

If a determination is made that none of the index numbers of the cached pages currently in the view is equal to the index number of the current data structure, the process then reads (DATA_STRUCT.content_length) bytes of data from processed data temporary file from the offset address indicated as (DATA_STRUCT.offset_address) to the beginning of the processed data temporary file (operation 1146). The process saves the read data into the new data content temporary file by appending it to the end (operation 1148).

The process then adjusts the value of the data member offset address of the current data structure, represented as: DATA_STRUCT.offset_address=PREV_DATA_STRUCT.offset_address+PREV_DATA_STRUCT.content_length (operation 1150). The process assigns the current data structure to the previous data structure for later reference, represented as: PREV_DATA_STRUCT.index_number=DATA_STRUCT.index_number; PREV_DATA_STRUCT.offset_address=DATA_STRUCT.offset_address; PREV_DATA_STRUCT.content_length=DATA_STRUCT.content_length (operation 1152). The process then appends the current data structure into the new index temporary file (operation 1154). Then the process returns back to operation 1128.

The process then flushes all files input/output and closes all file input/output handles (operation 1156).

The process then removes the processed data temporary file and renames the new data content temporary file as the processed data temporary file (operation 1158).

The process then removes the processed index temporary file and renames the new index temporary file as the processed index temporary file (operation 1160). The process then sets a content change flag to TRUE (operation 1162). The process then switches from real mode to virtual mode in the view (operation 1164), with the process terminating thereafter.

With reference now to FIGS. 12A-12D, an illustration of a flowchart of a process for deleting a large number of rows is depicted in accordance with an advantageous embodiment. The process in FIG. 12 may be implemented by a component, such as editor 400 upon selection of delete large number of rows 456 in FIG. 4, for example.

The process begins by identifying a selection of a large number of rows for deletion using input of a starting deletion row number and an ending deletion row number, represented as START_ROW_NUM and END_ROW_NUM (operation 1202). The selection may be made by a user, such as user 304 in FIG. 3, selecting delete large number of rows 456 from number of actions 454 in FIG. 4, and providing the input of START_ROW_NUM and END_ROW_NUM, for example. The process generates a new processed data temporary file and a new processed index temporary file (operation 1204). The process identifies the index number of the cached page containing the starting deletion row number, represented as INDEX_NUM_START (operation 1206). The process identifies the index number of the cached page containing the ending deletion row number, represented as INDEX_NUM_END (operation 1208).

The process retrieves data content for the number of cached pages from the processed data temporary file, starting from cached page index number one to cached page index number (INDEX_NUM_START−1L) (operation 1210). The process saves the data content retrieved into the new processed data temporary file (operation 1212). The process retrieves the index content for the number of cached pages from the processed index temporary file from cached page index number one to cached page index number (INDEX_NUM_START−1L) (operation 1214). The process saves the index content retrieved into the new processed index temporary file (operation 1216). The process retrieves the index data structure from the original processed index temporary file for the cached page index number (INDEX_NUM_START), assigns the data retrieved to a data structure named as DATA_STRUCT_START, and identifies the starting reading position in the processed data temporary file for cached page index number (INDEX_NUM_START) (operation 1218). The process then reads (START_ROW_NUM−((INDEX_NUM_START−1L)×MAX_ROW_NUM+1L)) rows of data from the processed data temporary file at the starting reading position above (operation 1220). The process then appends the number of rows of data read into a temporary memory segment (operation 1222).

The process retrieves the index data structure from the original processed index temporary file for the cached page index number (INDEX_NUM_END), assigns the data retrieved to a data structure named as DATA_STRUCT_END, and identifies the starting reading position in the processed data temporary file for the cached page index number (INDEX_NUM_END) (operation 1224). The process skips reading (END_ROW_NUM−(INDEX_NUM_END−1L)×MAX_ROW_NUM)) rows of data from the processed data temporary file at the starting reading position above, and moves the current reading position to the end of the those rows of data skipped above in the processed data temporary file (operation 1226). The process then reads (MAX_ROW_NUM−(START_ROW_NUM−((INDEX_NUM_START−1L)×MAX_ROW_NUM+1L))) rows of data from the processed data temporary file at the current reading position, and moves the current reading position accordingly, and appends the number of rows of data read above into the temporary memory segment (operation 1228).

The process then generates a data structure named as DATA_STRUCT and sets each data member value of this data structure as: DATA_STRUCT.index_number=INDEX_NUM_START; DATA_STRUCT.offset_address=DATA_STRUCT_START.offset_address; DATA_STRUCT.content_length=the data length of the temporary memory segment (operation 1230). The process then appends the temporary memory segment into the new processed data temporary file (operation 1232) and appends the index data structure DATA_STRUCT into the new processed index temporary file (operation 1234). The process then determines whether the reading operation in the processed data temporary file reaches the end of the processed data temporary file (operation 1236).

If a determination is made that the reading operation in the processed data temporary file reaches the end of the processed data temporary file, then the process proceeds to operation 1246.

If a determination is made that the reading operation in the processed data temporary file does not yet reach the end of the processed data temporary file, then the process reads (MAX_ROW_NUM) rows of data from the processed data temporary file at the current reading position, and moves the current reading position accordingly (operation 1238). The process then appends the data read into the new processed data temporary file (operation 1240). The process sets each data member of the data structure DATA_STRUCT with new values as: DATA_STRUCT.index_number=DATA_STRUCT.index_number+1L; DATA_STRUCT.offset_address=DATA_STRUCT.offset_address+DATA_STRUCT.content_length; DATA_STRUCT.content_length=the data length of the data read (operation 1242). The process appends the data structure DATA_STRUCT into the new processed index temporary file (operation 1244). The process then proceeds back to operation 1236.

The process flushes all files input/output and closes all file input/output handles (operation 1246). The process removes the original processed data temporary file and renames the new processed data temporary file as the processed data temporary file (operation 1248). The process removes the original processed index temporary file and renames the new processed index temporary file as the processed index temporary file (operation 1250). The process then loads the defined number of cached pages of data from the beginning of the processed data temporary file into the view, and displays the number of cached pages in the view (operation 1252). The process then sets the row number one as the current focus row (operation 1254), with the process terminating thereafter.

Figure 13A:
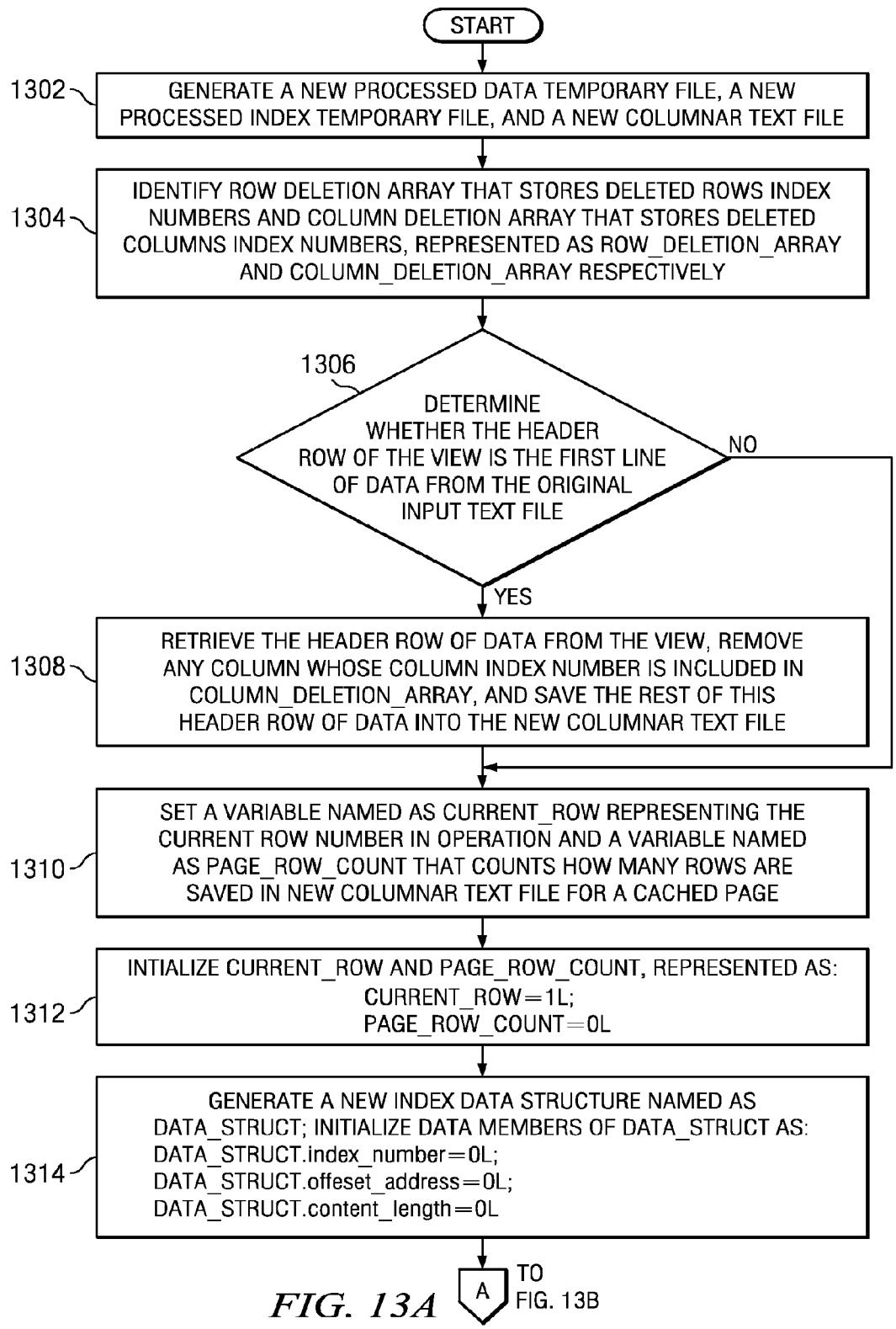
FIGS. 13A-13C are an illustration of a flowchart of a process for saving data changes back to the original input text file in accordance with an advantageous embodiment.
Figure 13B:
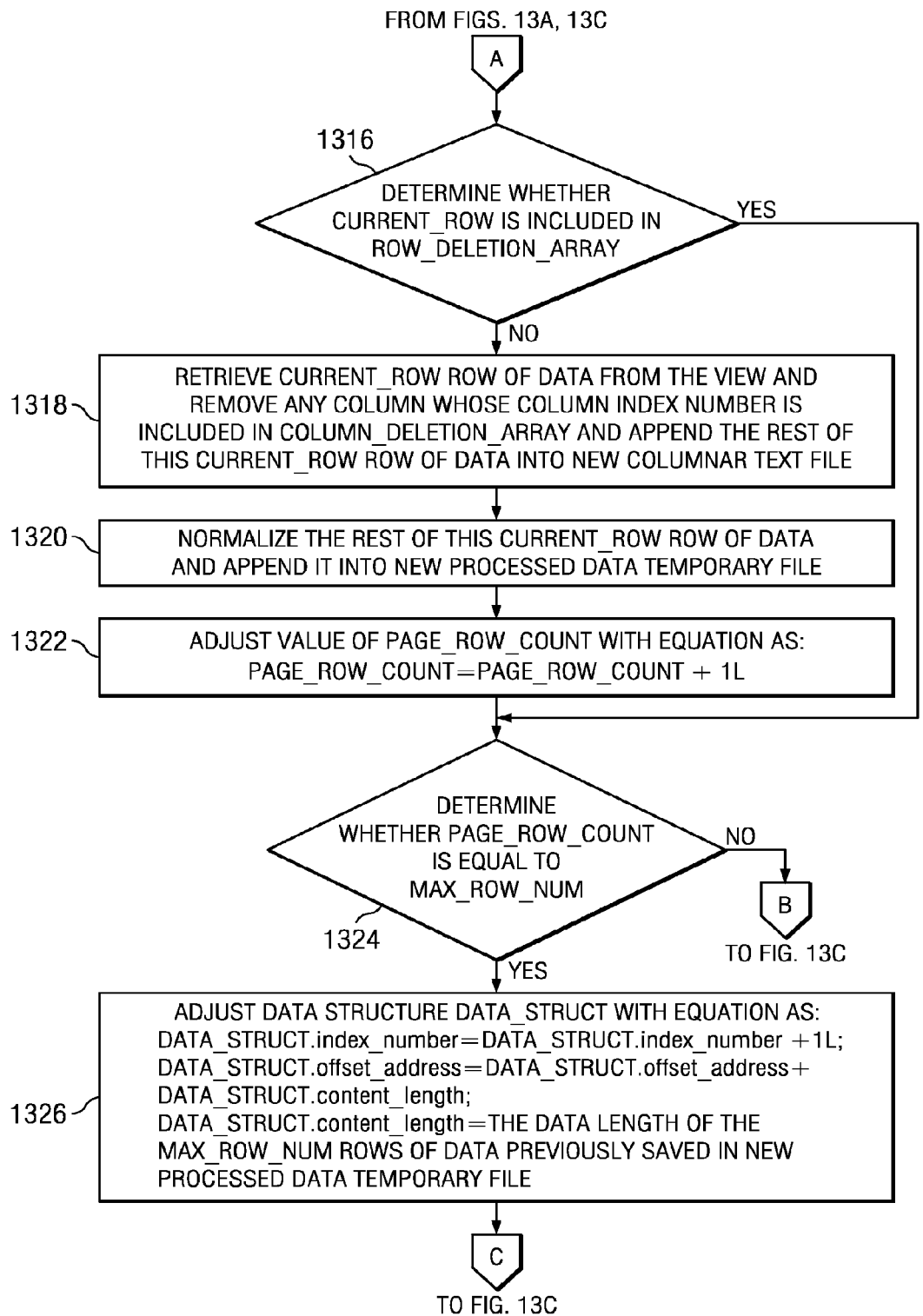
Figure 13C:
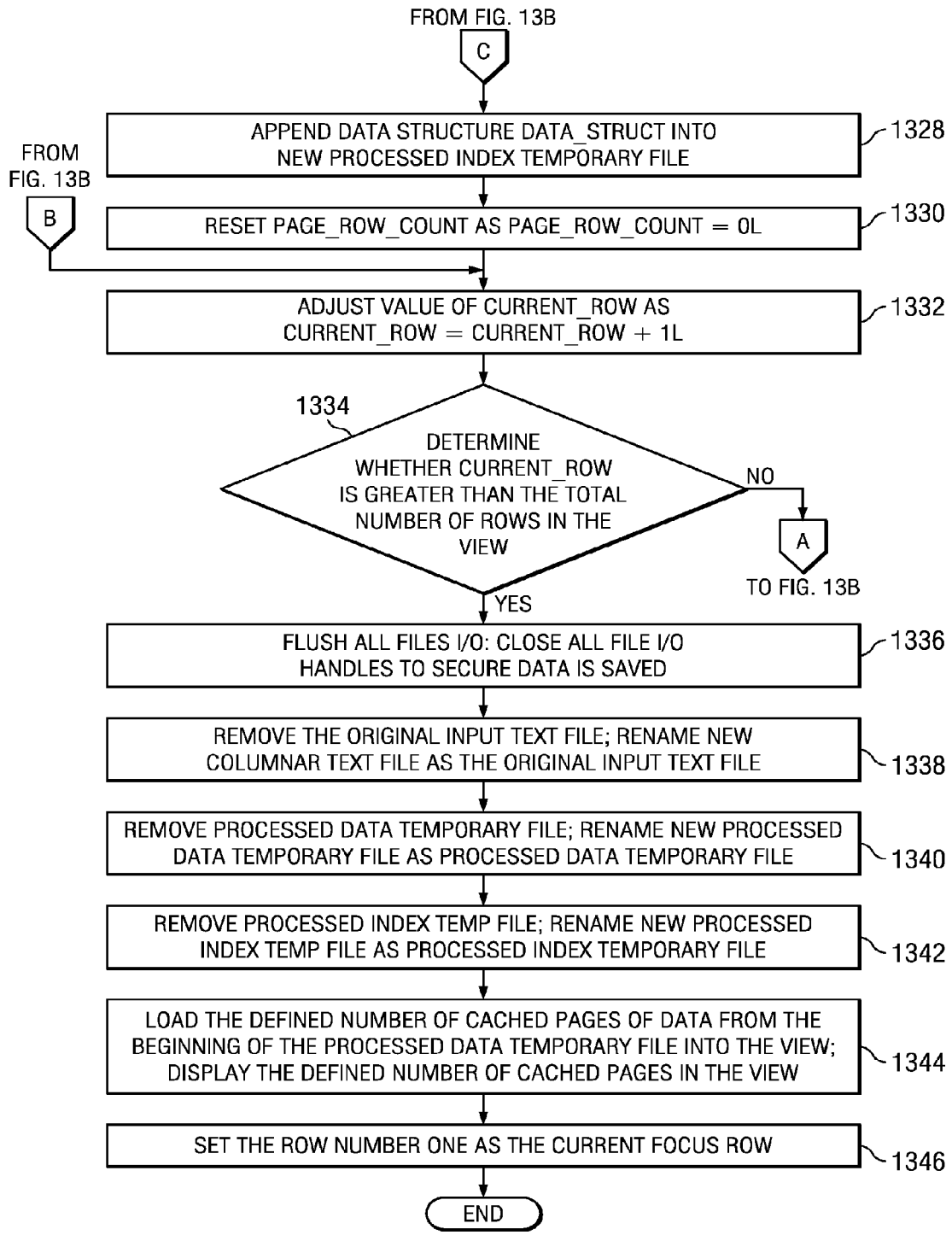

With reference now to FIGS. 13A-13C, an illustration of a flowchart of a process for saving data back to original input text file is depicted in accordance with an advantageous embodiment. The process in FIG. 13 may be implemented by a component, such as editor 400 upon selection of save data back to original file 459 in FIG. 4, for example.

The process in FIG. 13 may be activated by a selection of save data back to original file 459 from number of actions 454 in FIG. 4, for example. The selection may be made by a user, such as user 304 in FIG. 3, for example.

The process begins by generating a new processed data temporary file, a new processed index temporary file and a new columnar text file (operation 1302). The process identifies the row deletion array that stores the deleted rows index numbers, represented as ROW_DELETION_ARRAY, and identifies the column deletion array that stores the deleted columns index numbers, represented as COLUMN_DELETION_ARRAY (operation 1304). The process determines whether the header row of the view is the first line of data from the original input text file (operation 1306).

If a determination is made that the header row of the view is the first line of data from the original input text file (operation 1308). If a determination is made that the header row of the view is not the first line of data from the original input text file, the process proceeds to operation 1310. If a determination is made that the header row of the view is the first line of data from the original input text file, then the process retrieves the header row of data from the view, removes any column whose column index number is included in COLUMN_DELETION_ARRAY, and saves the rest of this header row of data into the new columnar text file (operation 1308). The process sets a variable named as CURRENT_ROW representing the current row number in operation, and sets another variable PAGE_ROW_COUNT that counts how many rows are saved in the new columnar text file for a cached page (operation 1310). The process initializes the two variables above as: CURRENT_ROW=1L; PAGE_ROW_COUNT=0L (operation 1312).

The process generates a new index data structure named as DATA_STRUCT, and initializes data members of DATA_STRUCT as: DATA_STRUCT.index_number=0L; DATA_STRUCT.offset_address=0L; DATA_STRUCT.content_length=0L (operation 1314). The process determines whether CURRENT_ROW is included in ROW_DELETION_ARRAY (operation 1316).

If a determination is made that the CURRENT_ROW is included in the ROW_DELETION_ARRAY, then process proceeds to operation 1324. If a determination is made that the CURRENT_ROW is not included in the ROW_DELETION_ARRAY, then the process retrieves this CURRENT_ROW row of data from the view and removes any column whose column index number is included in the COLUMN_DELETION_ARRAY, and appends the rest of this row of data into the new columnar text file (operation 1318). The process then normalizes the rest of this CURRENT_ROW row of data and appends it into the new processed data temporary file (operation 1320). The process adjusts the value of PAGE_ROW_COUNT with equation as: PAGE_ROW_COUNT=PAGE_ROW_COUNT+1L (operation 1322).

The process determines whether the PAGE_ROW_COUNT is equal to the maximum number of rows per cached page represented as MAX_ROW_NUM (operation 1324). If a determination is made that the PAGE_ROW_COUNT is not equal to the maximum number of rows per cached page, then the process proceeds to operation 1332. If a determination is made that the PAGE_ROW_COUNT is equal to the maximum number of rows per cached page, then the process adjusts the data structure DATA_STRUCT with equations as: DATA_STRUCT.index_number=DATA_STRUCT.index_number+1L; DATA_STRUCT.offset_address=DATA_STRUCT.offset_address+DATA_STRUCT.content_length; DATA_STRUCT.content_length=the data length of the MAX_ROW_NUM rows of data previously saved in the new processed data temporary file (operation 1326). The process then appends the data structure DATA_STRUCT into the new processed index temporary file (operation 1328). The process resets PAGE_ROW_COUNT as: PAGE_ROW_COUNT=0L (operation 1330). The process adjusts the value of CURRENT_ROW as: CURRENT_ROW=CURRENT_ROW+1L (operation 1332).

The process determines whether the CURRENT_ROW is greater than the total number of rows of the view (operation 1334). If a determination is made that the CURRENT_ROW is not greater than the total number of rows of the view, then the process proceeds back to operation 1316.

If a determination is made that the CURRENT_ROW is greater than the total number of rows of the view, then the process flushes all files input/output and closes all file input/output handles (operation 1336). The process removes the original input text file and renames the new columnar text file as the original input text file (operation 1338). The process removes the processed data temporary file and renames the new processed data temporary file as the processed data temporary file (operation 1340). The process removes the processed index temporary file and renames the new processed index temporary file as the processed index temporary file (operation 1342). The process then loads the defined number of cached pages of data from the beginning of the processed data temporary file into the view, and displays the defined number of cached pages of data in the view (operation 1344). The process sets the row number one as the current focus row (operation 1346), with the process terminating thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments provide a method for loading and editing text files with sizes exceeding available memory on a data processing system on which the files are to be loaded. The different advantageous embodiments provide a method and system that allows users to load these text files and perform data verification and changes that can be saved back to the text file despite the limitation of available memory on a data processing system.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for loading and editing text files, the method comprising:
    identifying a text file as input;
    determining whether the text file is a columnar text file;
    responsive to a determination that the text file is columnar, retrieving data information for the text file;
    identifying pre-defined cache settings having a defined number of cached pages and a maximum number of rows per cached page and a maximum number of columns per cached page; and
    determining whether the data information retrieved fits within the pre-defined cache settings;
    responsive to a determination that the data information retrieved fits within the pre-defined cache settings, determining whether the first row of the text file is a header row in a view;
    responsive to a determination that the first row of the text file is not a header row, normalizing the text file;
    responsive to a determination that the total number of rows is greater than the product of the defined number of cached pages multiplied by the maximum number of rows per cached page, selecting a virtual mode;
    applying a cached page data load and display process;
    applying a cached page data change and save process;
    saving data changes back to the text file; and
    selecting a view mode for load and edit operations of the text file.

2. The method of claim 1, further comprising:
    responsive to a determination that the data information retrieved does not fit within the pre-defined cache settings, generating an error message.

3. The method of claim 1, further comprising:
    responsive to a determination that the first row of the text file is a header row, configuring the first row of the text file as the header row;
    decreasing the total number of rows in the data information by one;
    normalizing the text file; and
    selecting the view mode for load and edit operations of the text file.

4. The method of claim 1, wherein normalizing the text file further comprises:
    replacing unreadable characters in the text file with readable characters.

5. The method of claim 1, wherein normalizing the text file further comprises:
    deleting unreadable characters in the text file.

6. The method of claim 1, wherein normalizing the text file further comprises:
    validating a number of delimiting characters.

7. The method of claim 1, wherein the text file has a size that is larger than an available memory on a data processing system.

8. The method of claim 1 further comprising:
    responsive to a determination that the total number of rows is not greater than the product of the number of cached pages multiplied by the maximum number of rows per cached page, selecting a real mode;
    loading data from the text file into a spreadsheet view;
    performing data operations directly in the spreadsheet view; and
    saving data changes directly from the spreadsheet view to the text file.

9. A system for loading and editing text files, the system comprising:
    a number of text files;
    a processor;
    a bus connected to the processor;
    a memory connected to the bus, the memory incapable of storing an entirety of the text files, the memory storing computer program code configured to execute, using the processor, an editor to identify a text file as input; determine whether the text file is a columnar text file; responsive to a determination that the text file is columnar, retrieve data information for the text file; identify pre-defined cache settings; determine whether the data information retrieved fits within the pre-defined cache settings; responsive to a determination that the data information retrieved fits within the pre-defined cache settings, determine whether the first row of the text file is a header row in a spreadsheet view; responsive to a determination that the first row of the text file is not a header row, normalize the text file; responsive to a determination that the total number of rows is greater than the product of the defined number of cached pages multiplied by the maximum number of rows per cached page, selecting a virtual mode, apply a cached page data load and display process, apply a cached page data change and save process, save data changes back to the text file, and select a mode for load and edit operations of the text file.

10. The system of claim 9, wherein the program code is further configured to execute the editor to, responsive to a determination that the data information retrieved does not fit within the pre-defined cache settings, generate an error message.

11. The system of claim 9, wherein the program code is further configured to execute the editor to, responsive to a determination that the first row of the text file is a header row, configure the first row of the text file as the header row; decrease the total number of rows in the data information by one; normalize the text file; and select a mode for load and edit operations of the text file.

12. The system of claim 9, wherein the program code is further configured to execute the editor to normalize the text file by replacing unreadable characters in the text file with readable characters.

13. The system of claim 9, wherein the program code is further configured to execute the editor to normalize the text file by deleting unreadable characters in the text file.

14. The system of claim 9, wherein the program code is further configured to execute the editor to normalize the text file by validating a number of delimiting characters for each line of data in the text file.

\* \* \* \* \*